(12) United States Patent
Nishi

(10) Patent No.: US 7,554,554 B2
(45) Date of Patent: Jun. 30, 2009

(54) RENDERING APPARATUS

(75) Inventor: Hidefumi Nishi, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 552 days.

(21) Appl. No.: 11/091,435

(22) Filed: Mar. 29, 2005

(65) Prior Publication Data

US 2005/0168473 A1 Aug. 4, 2005

Related U.S. Application Data

(63) Continuation of application No. PCT/JP03/04772, filed on Apr. 15, 2003.

(51) Int. Cl.
G09G 5/02 (2006.01)
G09G 5/00 (2006.01)
G09G 5/36 (2006.01)

(52) U.S. Cl. .................. 345/592; 345/629; 345/545

(58) Field of Classification Search .......... 345/629, 345/545, 505, 592
See application file for complete search history.

(56) References Cited

U.S. PATENT DOCUMENTS

| | | | | | |
|---|---|---|---|---|---|
| 5,673,422 A | * | 9/1997 | Kawai et al. | ................. | 345/519 |
| 5,870,102 A | * | 2/1999 | Tarolli et al. | ................. | 345/586 |
| 6,144,365 A | * | 11/2000 | Young et al. | ................. | 345/600 |

FOREIGN PATENT DOCUMENTS

| | | |
|---|---|---|
| EP | 0 952 546 A2 | 10/1999 |
| JP | 11-272846 | 10/1999 |
| JP | 2001-167289 | 6/2001 |
| JP | 2002-033904 | 1/2002 |
| JP | 2002-544544 A | 12/2002 |
| JP | 2003-006665 | 1/2003 |
| JP | 2004-544544 A | 12/2004 |
| WO | WO 00/68887 A1 | 11/2000 |

* cited by examiner

*Primary Examiner*—Hau H Nguyen
(74) *Attorney, Agent, or Firm*—Fujitsu Patent Center

(57) ABSTRACT

A rendering apparatus includes a low-speed frame buffer, and a first temporary memory and a second temporary memory with high-speed and small capacities. A first/second temporary memory rendering unit blends an image data already stored in the first/second temporary memory and another image data to be blended into the first/second temporary memory, and stores a result of the processing in the first/second temporary memory. A frame buffer rendering unit blends the blended images stored in the first/second temporary memory and a background image stored in the frame buffer.

14 Claims, 19 Drawing Sheets

$C_t, \alpha_t$: VALUE ALREADY WRITTEN IN TEMPORARY MEMORY
$C, \alpha$: VALUE TO BE RENDERED IN TEMPORARY MEMORY

SCREEN TO BE RENDERED
(=TRANSPARENT SCREEN)

BACKGROUND SCREEN

SCREEN AFTER DISPLAY
TRANSMISSION/NON-
TRANSMISSION PROCESSING

SCREEN TO BE RENDERED
(=TRANSPARENT SCREEN)

BACKGROUND SCREEN

SCREEN AFTER DISPLAY TRANSMISSION/NON-TRANSMISSION PROCESSING

ORIGINALLY INTENDED SCREEN

RENDERING APPARATUS

This nonprovisional application is a continuation application of and claims the benefit of International Application No. PCT/JP03/04772, filed Apr. 15, 2003. The disclosure of the prior application is hereby incorporated herein in its entirety by reference.

BACKGROUND OF THE INVENTION

1) Field of the Invention

The present invention relates to a rendering apparatus that performs alpha blending (transparent rendering).

2) Description of the Related Art

A rendering apparatus, such as a computer and a car navigation system, displays an image on a display by reading out its image data from a frame buffer. In general, inexpensive and low-speed memories like a synchronous DRAM (SDRAM) are used as the frame buffer which requires a large capacity. The rendering apparatus can include, as well as the frame buffer, an expensive and high-speed synchronous RAM (SRAM) as a temporary memory with a small capacity. The rendering apparatus with the temporary memory can render the image at high speed, since the image data of which is written in the SRAM and read out from the SRAM to the frame buffer.

Such a rendering apparatus can render the image more rapidly if it is provided with a plurality of temporary memories and a plurality of rendering units actuated in parallel. However, one rendering unit has to refer to a temporary memory of another rendering unit because an image previously rendered is required in the alpha blending. Thus, the rendering apparatus which is merely provided with the temporary memory and the rendering unit in plural does not always operate correctly.

Therefore, as shown in FIG. 15, one temporary memory 2 can be provided and accessed by a plurality of rendering units 3 and 4. However, when the rendering units 3 and 4 access the temporary memory 2 simultaneously, it is necessary to allow only one access and prohibit the other access since an SRAM used as the temporary memory 2 cannot process a plurality of accesses simultaneously. Thus, an arbitration unit 5 is required which arbitrates the accesses. As a result, only one rendering unit 3 accesses the temporary memory 2 while the other rendering unit 4 is waiting. Thus, there is a problem in that speedup of rendering in the apparatus as a whole cannot be realized.

Alternatively, as shown in FIG. 16, a plurality of temporary memories 6 and 7 can be provided and connected to a plurality of rendering units 3 and 4, respectively. However, it is necessary that image data in the temporary memory 6 and image data in the temporary memory 7 do not overlap on the frame buffer 1 at all. In this case, an overlap judging/distributing unit 8 is required to assure that figures to be rendered do not overlap at all. However, there is a problem in that speedup of rendering in the apparatus as a whole cannot be realized since the processing performed by the overlap judging/distributing unit 8 takes time.

On the other hand, there is a display control apparatus that performs transmission/non-transmission processing in display processing after performing the alpha blending in rendering processing. There is a method of setting a specific color as a transparent color and transmitting or not transmitting a color depending on whether the color is the specific color (see FIGS. 17A to 17C). There is also a method of adding transmittance information to color information and performing the transmission/non-transmission processing according to the transmittance.

FIG. 17A is a screen subjected to transmission/non-transmission processing without alpha blending in rendering processing. FIG. 17B is a background screen. FIG. 17C is a result of the transmission/non-transmission processing. In FIG. 17A, a lower half of a triangle 12 is buried in a trapezoid 11. Parts of backgrounds 13 and 14 shown in FIG. 17B are also shown in FIG. 17C. However, the trapezoid 11 and the triangle 12 on the backgrounds 13 and 14 are not transparent.

The alpha blending in rendering processing is performed to an image in the frame buffer. The frame buffer is cleared with an initial value, which is 0 in general (that is, black). The alpha blending is performed to this initial image in which nothing is yet drawn.

The triangle 12 shown in FIG. 18B is a result of the alpha blending in rendering processing performed to the triangle 12 shown in FIG. 18A (same as FIG. 17A). In FIG. 18A, since the triangle 12 is not transparent, parts of the trapezoid 11 and a background 15 overlapping the triangle 12 are not seen. On the other hand, in FIG. 18B, a color and a pattern of the background 15 are seen weakly in an upper half 16 of the triangle 12 and a color and a pattern of the trapezoid 11 are seen weakly in a lower half 17 of the triangle 12, since the triangle 12 is semi-transparent.

Furthermore, there is a display control apparatus that performs alpha blending, in stead of the transmission/non-transmission processing, in display processing after performing it in rendering processing (the alpha blending can be performed in display processing as well as in rendering processing). The alpha blending in display processing is a processing to blend a plurality of images created and stored in the frame buffer in rendering processing.

However, as explained above, the alpha blending in rendering processing is applied to the initial image of black. Thus, black color is transparent in the blended image. When this image is subjected to the alpha blending in display processing, a blackish color can be seen in the blended image which is displayed on a display. When the transmission/non-transmission processing is performed in display processing, in stead of the alpha blending, a non-transparent part has a blackish color on the display and is not blended with a background screen (see FIGS. 19A to 19D).

FIG. 19A is a screen subjected to transmission/non-transmission processing with alpha blending in rendering processing. FIG. 19B is a background screen. FIG. 19C is a result of the transmission/non-transmission processing. In FIG. 19A, the triangle 12 is transparent and the lower half of which is buried in the trapezoid 11. Thus, a color and a pattern of the background 15 are seen weakly in the upper half 16 of the triangle 12 and a color and a pattern of the trapezoid 11 are seen weakly in the lower half 17 of the triangle 12. The backgrounds 13 and 14 around the trapezoid 11 and the triangle 12 shown in FIG. 19C are the same as those shown in FIG. 19B. However, the color and the pattern of the background 15 shown in FIG. 19A are still seen weakly in the upper half 16 of the triangle 12.

Originally, as shown in FIG. 19D, a color and a pattern of the background 13 in an upper half of FIG. 19B have to be seen weakly since the triangle 12 is semi-transparent. However, as described above, conventional technology has a problem in that an unintended image can be displayed when the alpha blending is performed in rendering processing and the transmission/non-transmission processing is performed in display processing, or when the alpha blending is performed not only in rendering processing but also display processing.

SUMMARY OF THE INVENTION

It is an object of the present invention to at least solve the problems in the conventional technology.

A rendering apparatus according to an aspect of the present invention blends a plurality of source images into a destination image stored in a frame buffer and renders a blended image of the source images and the destination image on a display. The rendering apparatus includes a temporary memory of higher speed and smaller capacity than the frame buffer; a calculating unit that calculates a first data and a second data without using the destination image and stores the first data and the second data in the temporary memory; and a blending unit that blends the source images into the destination image using the first data and the second data stored in the temporary memory to obtain the blended image, and stores the blended image in the frame buffer.

A rendering apparatus according to another aspect of the present invention blends a plurality of source images into a destination image stored in a frame buffer and renders a blended image of the source images and the destination image on a display. The rendering apparatus includes a temporary memory of higher speed and smaller capacity than the frame buffer; and a processor that executes a computer program. The computer program causes the processor to execute calculating a first data and a second data without using the destination image; storing the first data and the second data in the temporary memory; blending the source images into the destination image using the first data and the second data stored in the temporary memory to obtain the blended image; and storing the blended image in the frame buffer.

A display control apparatus according to still another aspect of the present invention displays an image on a display, and includes a first frame buffer; a second frame buffer; a first synthesizing unit that creates a first synthesized image by blending an image into another image stored in the first frame buffer, and stores the first synthesized image in the first frame buffer; a second synthesizing unit that creates a second synthesized image of the first synthesized image and a background image, and stores the second synthesized image in the second frame buffer; and a display control unit that displays the second synthesized image.

A display control apparatus according to still another aspect of the present invention displays an image on a display, and includes a first frame buffer; a second frame buffer; a processor that executes a computer program. The computer program causes the processor to execute creating a first synthesized image by blending an image into another image stored in the first frame buffer; storing the first synthesized image in the first frame buffer; creating a second synthesized image of the first synthesized image and a background image; and storing the second synthesized image in the second frame buffer. The display control apparatus further includes a display control unit that displays the second synthesized image.

The other objects, features, and advantages of the present invention are specifically set forth in or will become apparent from the following detailed description of the invention when read in conjunction with the accompanying drawings.

DETAILED DESCRIPTION

Figure 1:
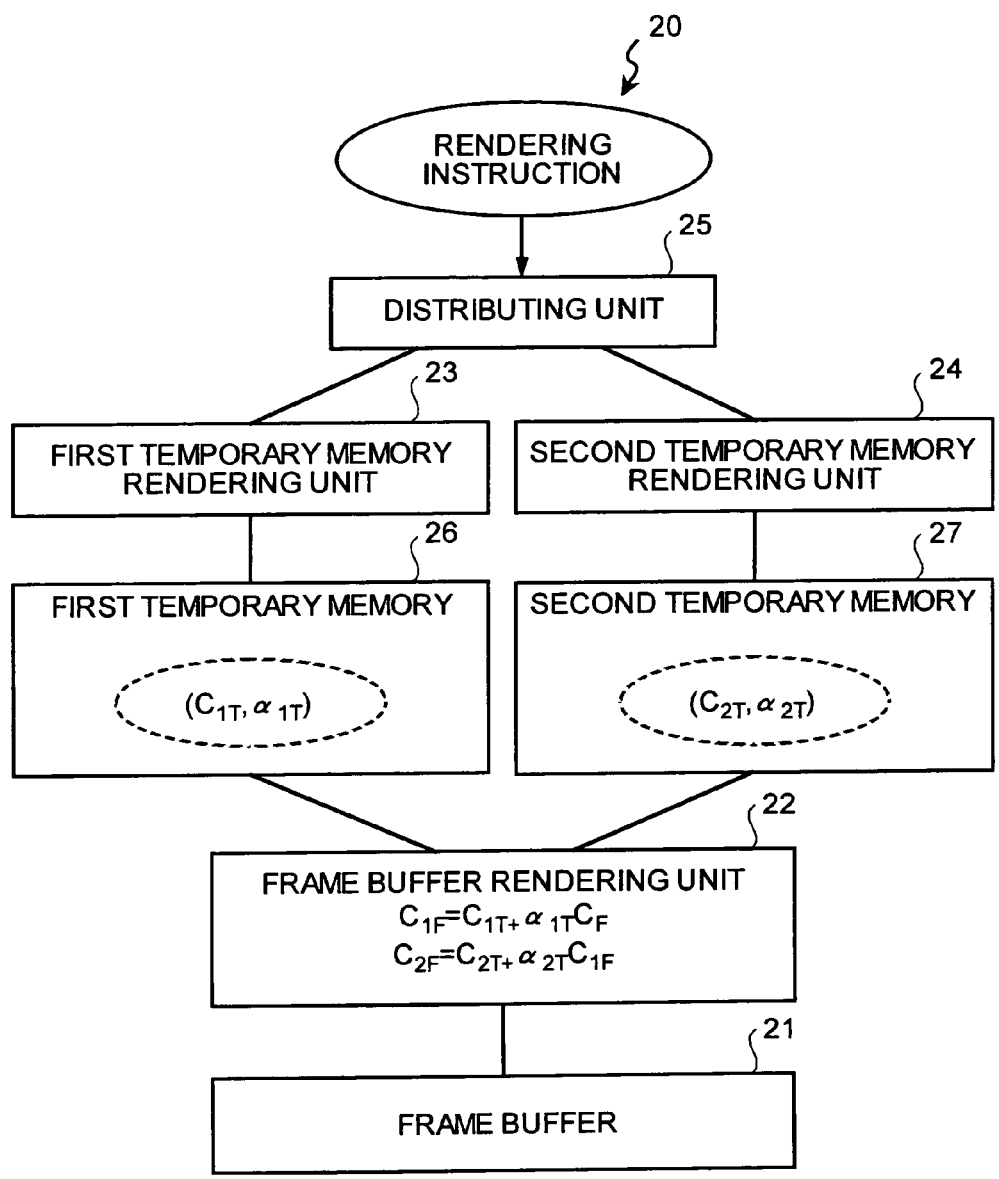
FIG. 1 is a block diagram of a schematic structure of a rendering apparatus according to a first embodiment of the present invention.

Exemplary embodiments of the present invention will be explained in detail with reference to the accompanying drawings.

In a first embodiment, calculation to a frame buffer and calculation to a temporary memory are performed separately. First, a method for the separation will be explained.

$C_F$ is a color code (image data) already stored in the frame buffer, and $C_1$ is a color code (image data) to be blended into $C_F$. A blend ratio of $C_1$ is $\alpha_1$ (0.0 to 1.0). A blended color code $C_{1F}$ of $C_F$ and $C_1$ is represented by the following expression (1).

$$C_{1F} = \alpha_1 C_1 + (1-\alpha_1)C_F \qquad (1)$$

The color code $C_F$ in the frame buffer is overwritten by $C_{1F}$ according to alpha blending represented by expression (1). Next, a color code $C_2$ is blended into $C_{1F}$ at a blend ratio $\alpha_2$ (0.0 to 1.0). A blended color code $C_{21F}$ of $C_{1F}$ and $C_2$ is represented by the following expression (2).

$$C_{21F} = \alpha_2 C_2 + (1-\alpha_2)C_{1F} \qquad (2)$$

The color code $C_{1F}$ in the frame buffer is overwritten by $C_{21F}$ according to alpha blending represented by expression (2). Therefore, when a color code to be blended into $C_{21F}$ is $C_3$ and a blend ratio is $\alpha_3$ (0.0 to 1.0), a blended color code $C_{321F}$ of $C_{21F}$ and $C_3$ is represented by the following expression (3).

$$C_{321F} = \alpha_3 C_3 + (1-\alpha_3) C_{21F} \quad (3)$$

Although not described here, results of subsequent alpha blending are calculated in the same manner. The expressions (1) to (3) can be modified as the following expressions (4) to (6), respectively.

$$\begin{aligned} C_{1F} &= \alpha_1 C_1 + (1-\alpha_1) C_F \\ &= C'_1 + (1-\alpha_1) C_F \end{aligned} \quad (4)$$

$$\begin{aligned} C_{21F} &= \alpha_2 C_2 + (1-\alpha_2) C_{1F} \\ &= \alpha_2 C_2 + (1-\alpha_2) C'_1 + (1-\alpha_2)(1-\alpha_1) C_F \\ &= C'_{21} + (1-\alpha_2)(1-\alpha_1) C_F \end{aligned} \quad (5)$$

$$\begin{aligned} C_{321F} &= \alpha_3 C_3 + (1-\alpha_3) C_{21F} \\ &= \alpha_3 C_3 + (1-\alpha_3) C'_{21} + (1-\alpha_3)(1-\alpha_2)(1-\alpha_1) C_F \\ &= C'_{321} + (1-\alpha_3)(1-\alpha_2)(1-\alpha_1) C_F \end{aligned} \quad (6)$$

Thus, calculation of $C_1'$, $C_{21}'$, and $C_{321}'$, which can be calculated without referring to $C_F$ in the frame buffer at all, are separated from calculation of $(1-\alpha_1)C_F$, $(1-\alpha_2)(1-\alpha_1)C_F$, and $(1-\alpha_3)(1-\alpha_2)(1-\alpha_1)C_F$. Therefore, when there are a plurality of temporary memories, it is possible to perform the calculation $C_1'$, $C_{21}'$, and $C_{321}'$ independently and store the results in respective temporary memories.

Color codes and alpha elements, which are stored in the temporary memories at each stage, are $C_1$, and $(1-\alpha_1)$ at the first stage, $C_{21}'$ and $(1-\alpha_2)(1-\alpha_1)$ at the second stage, and $C_{321}$, and $(1-\alpha_3)(1-\alpha_2)(1-\alpha_1)$ at the third stage. Subsequently, in the same manner, color codes and alpha elements stored in the temporary memories are overwritten.

When the color code and the alpha element stored in the temporary memory are $C_T$ and $\alpha_T$, alpha blending to be performed between the temporary memory and the frame buffer is represented by the following expression (7).

$$C_{TF} = C_T + \alpha_T C_F \quad (7)$$

As described above, when there is a plurality of temporary memories, it is possible to calculate $C_T$ for the respective temporary memories independently. However, when the calculation (7) is performed between the temporary memories and the frame buffer, the order of assigning color code in each temporary memory to $C_T$ of expression (7) is required to be adjusted to the order of rendering instructions.

That is, when rendering based on first to fifth rendering instructions is applied to a first temporary memory and rendering based on sixth to tenth rendering instructions is applied to a second temporary memory, it is possible to perform the calculation of $C_T$ for the respective temporary memories in parallel. Concerning the final calculation of $C_{TF}$ between the temporary memories and the frame buffer, the calculation for the first temporary memory is performed first and, then, the calculation for the second temporary memory is performed, whereby it is possible to keep consistency of the calculation.

Next, a specific constitution of the first embodiment will be explained. FIG. 1 is a block diagram of a schematic structure of a rendering apparatus according to the first embodiment. As shown in FIG. 1, a rendering apparatus 20 in the first embodiment includes: a frame buffer 21 including an SDRAM; a frame buffer rendering unit 22 that applies rendering to the frame buffer 21; a small capacity (e.g., 64×64 pixels) and high-speed first temporary memory 26 including an SRAM; a first temporary memory rendering unit 23 that applies rendering to the first temporary memory 26; a second temporary memory rendering unit 24 that applies rendering to the second temporary memory 27; and a distributing unit 25 that allocates an area, in which a figure to be drawn according to a rendering instruction is placed, to the first temporary memory 26 or the second temporary memory 27.

Next, structures of the first temporary memory rendering unit 23 and the second temporary memory rendering unit 24 will be explained. However, the second temporary memory rendering unit 24 has the same structure as the first temporary memory rendering unit 23. Thus, only the first temporary memory rendering unit 23 will be explained.

In the following explanation, a color code and a blend ratio already calculated and stored in the temporary memory 26 are $C_t$ and $\alpha_t$, respectively. A color code and a blend ratio of an image to be blended into the temporary memory 26 are $C$ and $\alpha$, respectively.

Figure 2:
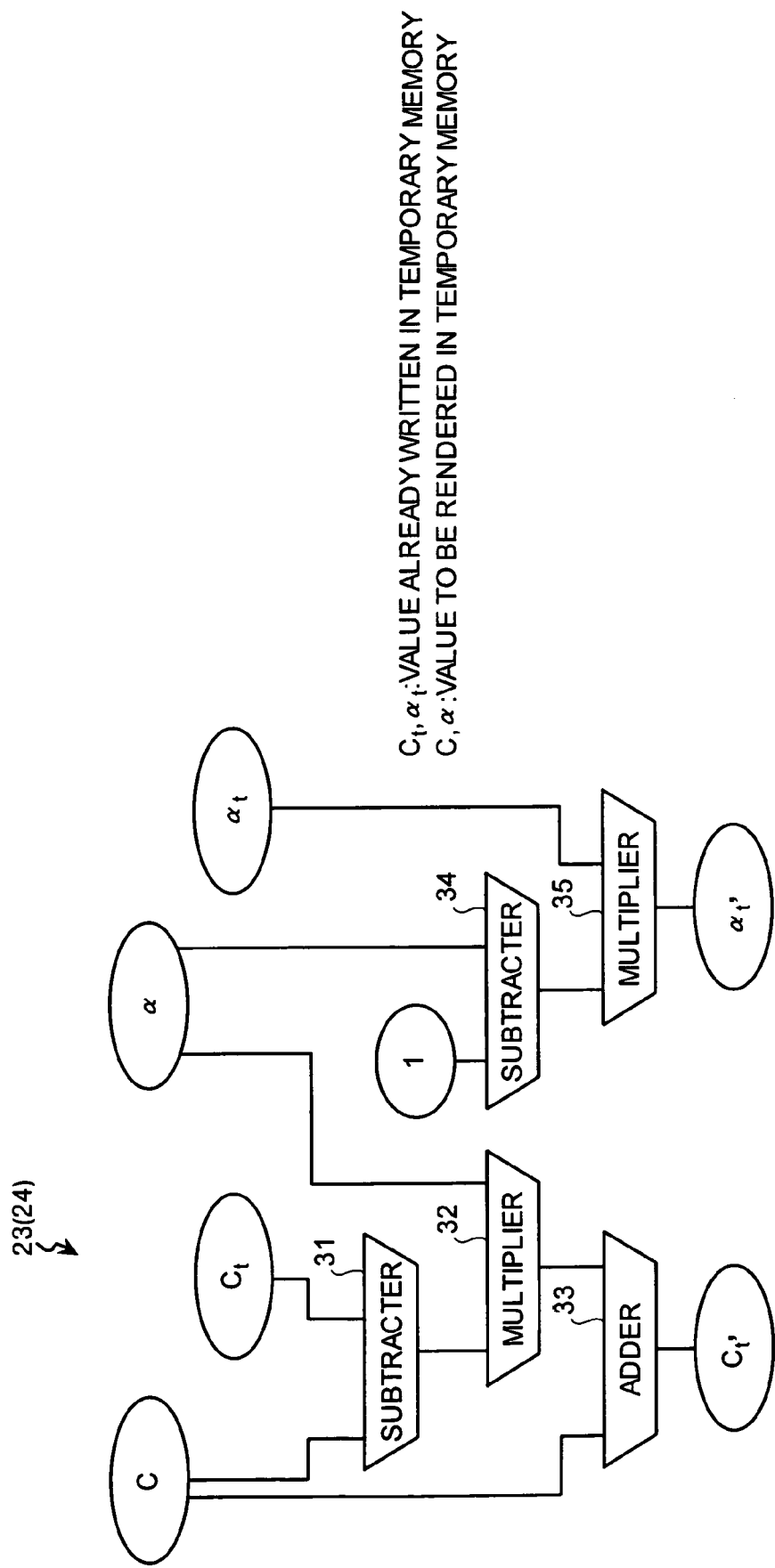
FIG. 2 is a block diagram of a structure of a temporary memory rendering unit of the rendering apparatus.

FIG. 2 is a block diagram of the structure of the first temporary memory rendering unit 23. The first temporary memory rendering unit 23 includes a first subtracter 31, a first multiplier 32, a first adder 33, a second subtracter 34, and a second multiplier 35. The color codes and the alpha elements in each stage, that is, $C_1'$ and $(1-\alpha_1)$, $C_{21}'$ and $(1-\alpha_2)(1-\alpha_1)$, and $C_{321}'$ and $(1-\alpha_3)(1-\alpha_2)(1-\alpha_1)$ are calculated by the first subtracter 31, the first multiplier 32, the first adder 33, the second subtracter 34, and the second multiplier 35.

The first subtracter 31 subtracts the color code $C_t$ from the color code $C$. The first multiplier 32 multiplies an output of the first subtracter 31 by the blend ratio $\alpha$.

The first adder 33 adds the color code $C$ to an output of the first multiplier 32. An output $C_t'$ of the first adder 33 is stored in the temporary memory 26 as a new color code. In the next stage, $C_t'$ is used as the color code $C_t$.

The second subtracter 34 subtracts the blend ratio $\alpha$ from 1. The second multiplier 35 multiplies an output of the second subtracter 34 by the blend ratio $\alpha_t$. An output $\alpha_t'$ of the second multiplier 35 is stored in the temporary memory 26 as a new blend ratio. In the next stage, $\alpha_t'$ is used as the blend ratio $\alpha_t$.

Next, a structure of the frame buffer rendering unit 22 will be explained. In the following explanation, a color code and a blend ratio stored in the temporary memory 26 are $C_t$ and $\alpha_t$, respectively, and a color code of an image stored in the frame buffer 21 is $C_f$.

Figure 3:
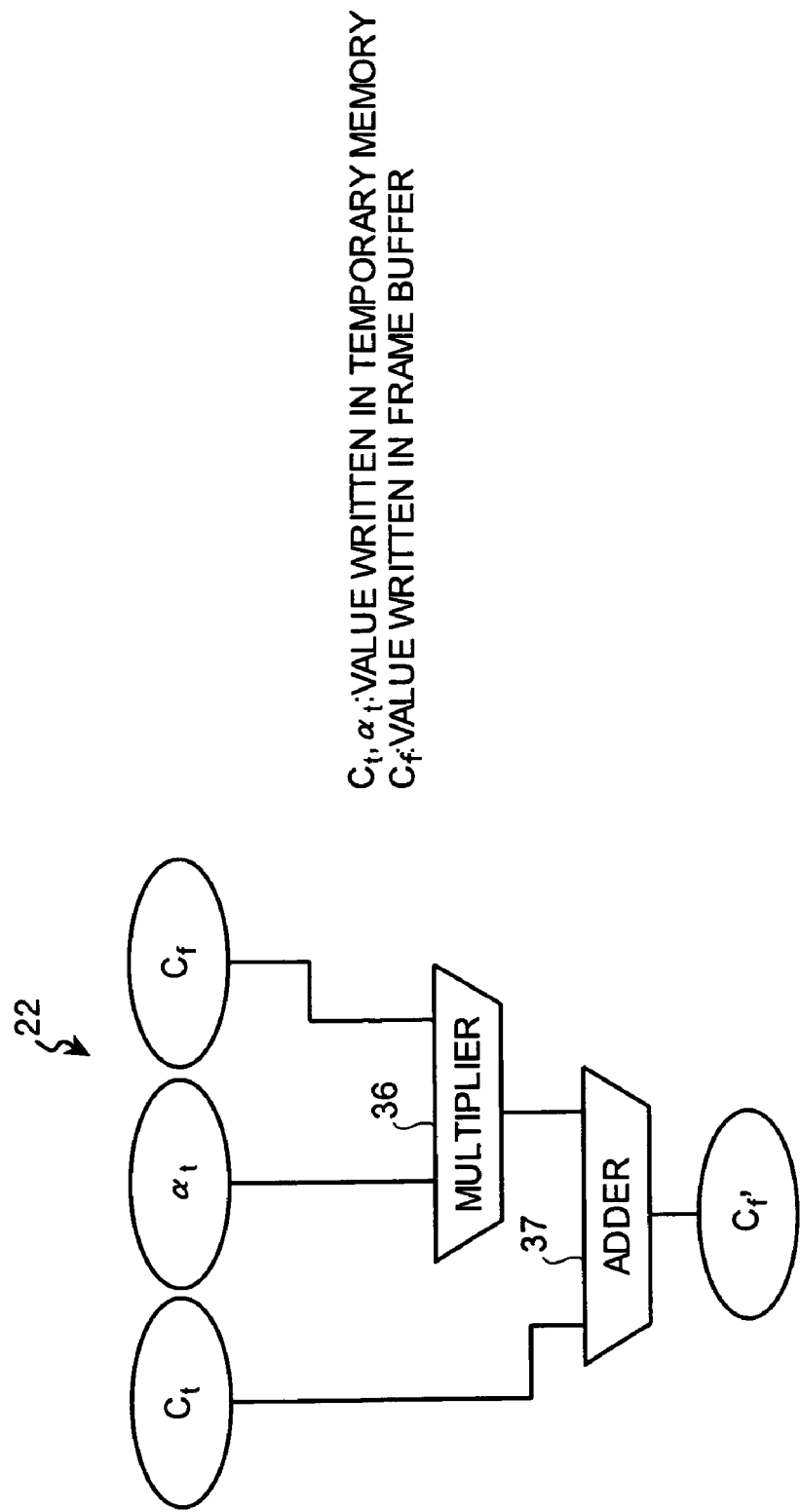
FIG. 3 is a block diagram of a structure of a frame buffer rendering unit of the rendering apparatus.

FIG. 3 is a block diagram of the structure of the frame buffer rendering unit 22. The frame buffer rendering unit 22 includes a third multiplier 36 and a second adder 37. The calculation of expression (7) is performed by the third multiplier 36 and the second adder 37. Note that $C_t$ equals $C_T$, $\alpha_T$ equals $\alpha_T$, and $C_f$ equals $C_F$.

The third multiplier 36 multiplies the color code $C_f$ by the blend ratio $\alpha_t$. The second adder 37 adds the color code $C_t$ to an output of the third multiplier 36. An output $C_f'$ of the second adder 37 ($C_{TF}$ in expression (7)) is stored in the frame buffer 21 as a new color code. In the next calculation between the temporary memory 27 and the frame buffer 21, $C_f'$ is used as the color code $C_f$ of the image stored in the frame buffer 21.

Next, an operation of the rendering apparatus 20 in the first embodiment will be explained. First, the first temporary memory 26 and the second temporary memory 27 are cleared with C=0 and α=1.0 in advance, to set $C_t$ to $\alpha C$ and $\alpha_t$ to $(1-\alpha)$.

First, the distributing unit 25 allocates an area A (for example, an area of 64×64 pixels), in which a figure is rendered according to a rendering instruction, to the first temporary memory 26. As long as the figure is within the area A, the distributing unit 25 continues to send the rendering instruction to the first temporary memory rendering unit 23, which applies rendering processing to the first temporary memory 26 according to the sent rendering instruction.

When the figure deviates from the area A while the rendering processing is applied to the first temporary memory 26, the distributing unit 25 allocates a new area B (for example, an area of 64×64 pixels), which includes the figure deviating from the area A, to the second temporary memory 27. A color code and an alpha element stored in the first temporary memory 26 at this point are $C_{1T}$ and $\alpha_{1T}$, respectively.'

As long as the figure is within the area B, the distributing unit 25 continues to send the rendering instruction to the second temporary memory rendering unit 24, which applies rendering processing to the second temporary memory 27 according to the sent rendering instruction. On the other hand, the frame buffer rendering unit 22 performs blend processing between the first temporary memory 26 and the frame buffer 21 and writes a result of the blend processing in the frame buffer 21.

As described above, the color code and the alpha element stored in the first temporary memory 26 are $C_{1T}$ and $\alpha_{1T}$, respectively. When a color code written in the frame buffer 21 is $C_F$, the color code $C_{1F}$, which is written in the frame buffer 21 anew according to blend processing between the first temporary memory 26 and the frame buffer 21, is represented by the following expression (8).

$$C_{1F}=C_{1T}+\alpha_{1T}C_F \quad (8)$$

When the figure deviates from the area B while the rendering processing is applied to the second temporary memory 27, the distributing unit 25 allocates a new area C (for example, an area of 64×64 pixels) including the figure deviating from the area B to the first temporary memory 26. A color code and an alpha element stored in the second temporary memory 27 at this point are $C_{2T}$ and $\alpha_{2T}$, respectively.

As long as the figure is within the area C, the distributing unit 25 continues to send the rendering instruction to the first temporary memory rendering unit 23, which applies rendering processing to the first temporary memory 26 according to the sent rendering instruction. On the other hand, the frame buffer rendering unit 22 performs blend processing between the second temporary memory 27 and the frame buffer 21 and writes a result of the blend processing in the frame buffer 21.

As described above, the color code and the alpha element stored in the second temporary memory 27 are $C_{2T}$ and $\alpha_{2T}$, respectively, and the color code in the frame buffer 21 is $C_{1F}$. Therefore, a color code $C_{2F}$ represented by the following expression (9) is written in the frame buffer 21 anew.

$$C_{2F}=C_{2T}+\alpha_{2T}C_{1F} \quad (9)$$

Thereafter, the rendering processing applied to the first temporary memory 26 and the rendering processing applied to the second temporary memory 27 are repeated alternately.

Note that it is also possible to use software to realize the operation of the rendering apparatus 20 in the first embodiment. In this case, a not-shown processing device executes a program of a flowchart shown in FIG. 4, whereby the functions of the frame buffer rendering unit 22, the first temporary memory rendering unit 23, the second temporary memory rendering unit 24, and the distributing unit 25 are realized.

Figure 4:
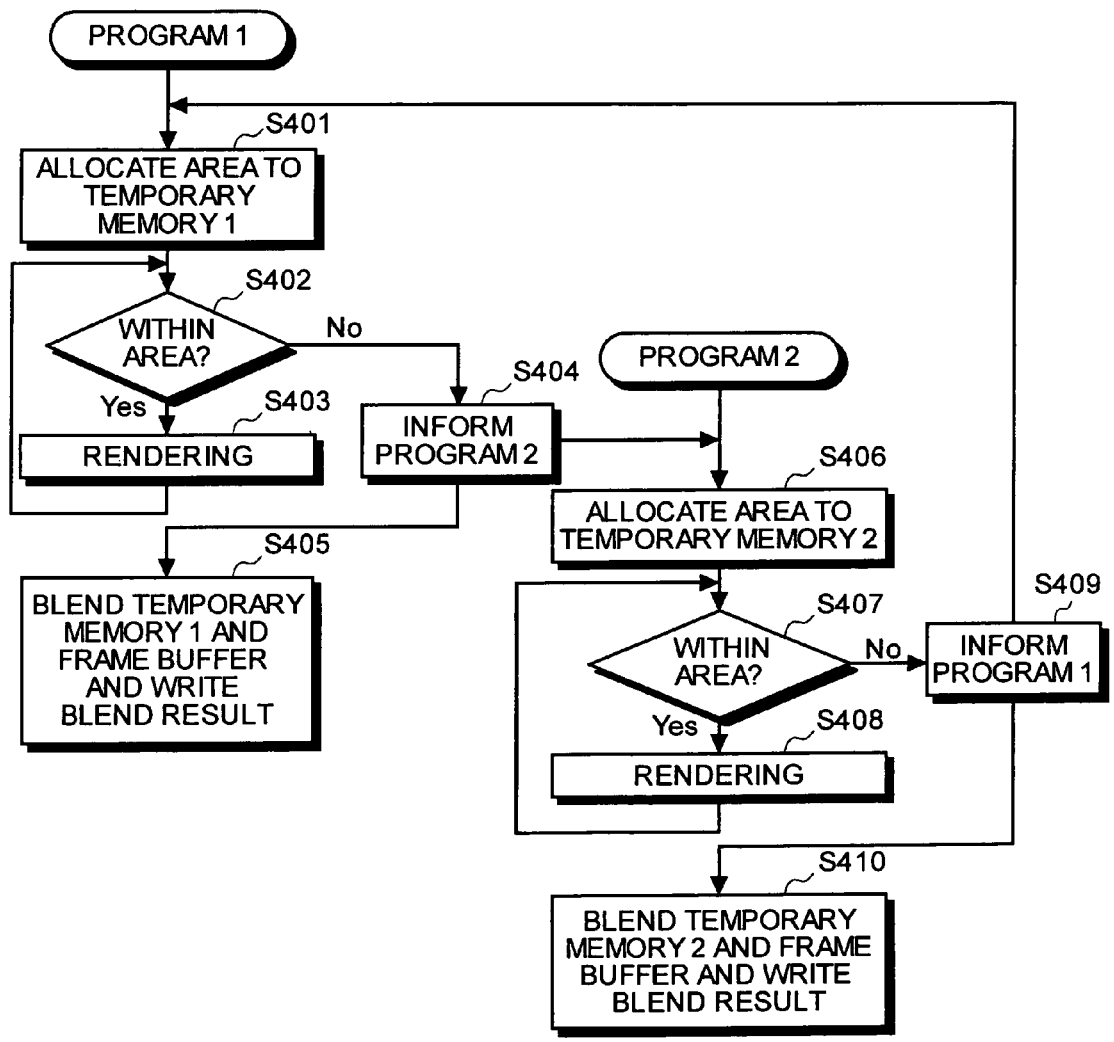
FIG. 4 is a flowchart of a program for realizing the rendering apparatus according to the first embodiment.

The flowchart shown in FIG. 4 will be explained. First, when a program 1 is executed, the processing device clears the first temporary memory 26 and the second temporary memory 27 and, then, allocates the area A to the first temporary memory 26 (step S401). As long as a figure drawn according to a rendering instruction is within the area A ("Yes" at step S402), the processing device applies rendering processing to the first temporary memory 26 (step S403).

When the figure deviates from the area A while the rendering processing is applied to the first temporary memory 26 ("No" at step S402), the processing device informs a program 2 of the deviation of the figure from the area A (step S404). In the program 2, the processing device allocates the area B to the second temporary memory 27 (step S406). As long as the figure is within the area B ("Yes" at step S407), the processing device applies the rendering processing to the second temporary memory 27 (step S408).

In the program 1, the processing device performs blend processing between the first temporary memory 26 and the frame buffer 21 and writes a result of the blend processing in the frame buffer 21 (step S405). On the other hand, when the figure deviates from the area B while the rendering processing is applied to the second temporary memory 27 ("No" at step S407), the processing device informs the program 1 of the deviation of the figure from the area B (step S409).

The processing device performs blend processing between the second temporary memory 27 and the frame buffer 21 and writes a result of the blend processing in the frame buffer 21 (step S410). In the program 1, the processing device allocates the area C to the first temporary memory 26 (step S401). Thereafter, the processing device executes steps S402 to S405.

According to the first embodiment, the first temporary memory rendering unit 23 and the second temporary memory rendering unit 24 can perform blend processing independently, to realize high-speed rendering. Furthermore, the blend processing is performed according to the order of rendering instructions, to perform alpha blending correctly.

Figure 5:
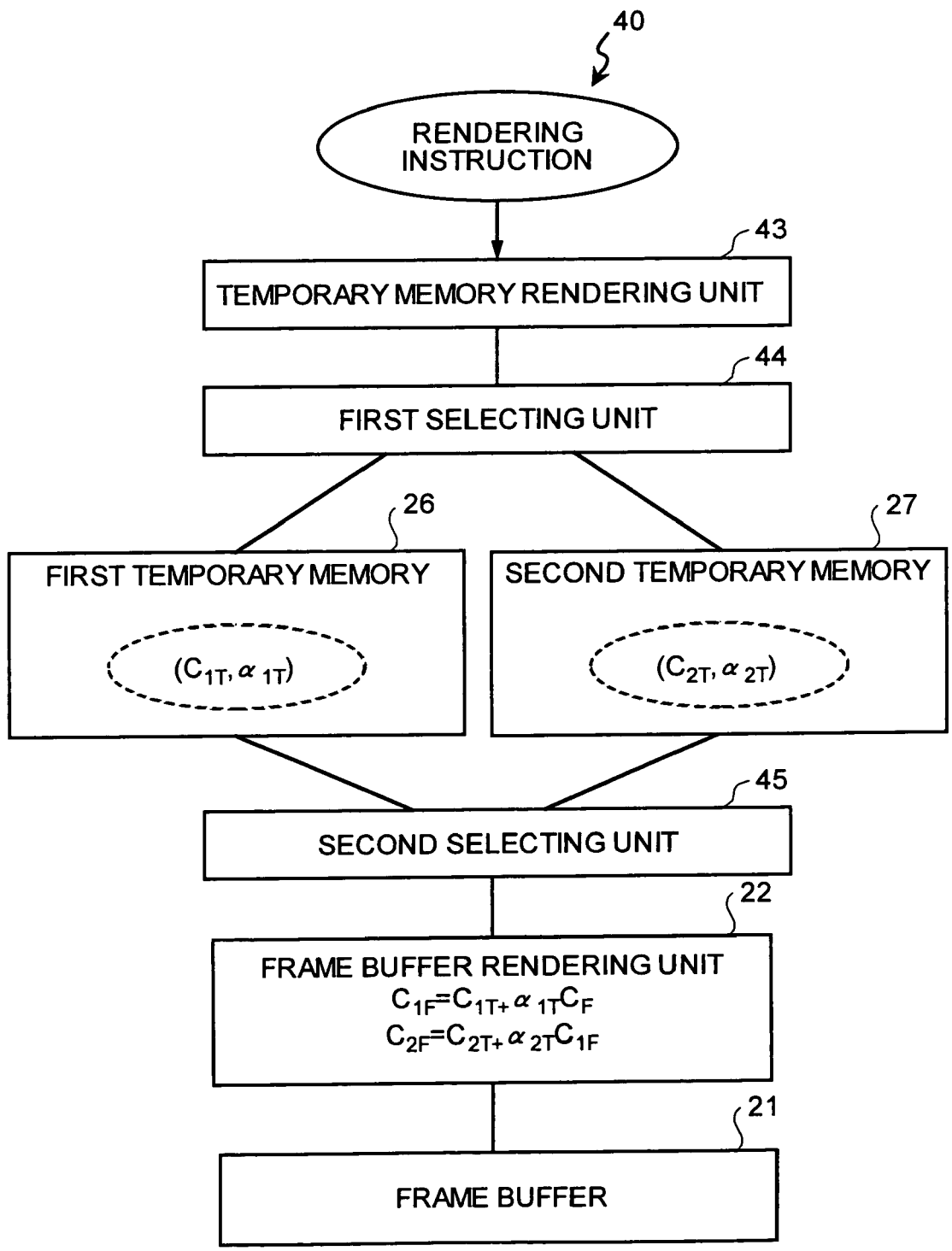
FIG. 5 is a block diagram of a schematic structure of a rendering apparatus according to a second embodiment of the present invention.

FIG. 5 is a block diagram of a schematic structure of a rendering apparatus according to a second embodiment. As shown in FIG. 5, a rendering apparatus 40 in the second embodiment includes the frame buffer 21, the frame buffer rendering unit 22, a first temporary memory 26, a second temporary memory 27, a temporary memory rendering unit 43 that applies rendering to the first temporary memory 26 and the second temporary memory 27, and selecting units 44 and 45 that select the first temporary memory 26 or the second temporary memory 27 alternatively.

The temporary memory rendering unit 43 is the same as the first temporary memory rendering unit 23 and the second temporary memory rendering unit 24 in the first embodiment. Therefore, an explanation of the temporary memory rendering unit 43 is omitted. Note that, in the second embodiment, components same as those in the first embodiment are denoted by reference numerals and signs identical to those in the first embodiment and explanations of the components are omitted.

Next, an operation of the rendering apparatus 40 in the second embodiment will be explained. First, the first temporary memory 26 and the second temporary memory 27 are cleared with C=0 and $\alpha$=1.0 in advance. The first selecting unit 44 allocates a 64×64 pixel area (an area A), in which a figure drawn according to a rendering instruction is placed, to the first temporary memory 26. As long as a figure drawn according to a rendering instruction is within the area A, the first selecting unit 44 continues to select the first temporary memory 26. Consequently, the temporary memory rendering unit 43 applies rendering processing to the first temporary memory 26 according to the sent rendering instruction.

On the other hand, the second selection unit 45 selects the second temporary memory 27. The frame buffer rendering unit 22 performs blend processing between the second temporary memory 27 and the frame buffer 21 and writes a result of the blend processing in the frame buffer 21.

When a figure drawn according to a rendering instruction deviates from the area A while the rendering processing is applied to the first temporary memory 26, the result of the blend processing performed between the second temporary memory 27 and the frame buffer 21 is written in the frame buffer 21. Then, the selecting unit 44 allocates a new 64×64 pixel area including the figure deviating from the area A to the second temporary memory 27. A color code and an alpha element recorded in the first temporary memory 26 at this point are $C_{1T}$ and $\alpha_{1T}$, respectively.

As long as a figure drawn according to a rendering instruction is within the area B, the first selecting unit 44 continues to select the second temporary memory 27. Consequently, the temporary memory rendering unit 43 applies rendering processing to the second temporary memory 27 according to the sent rendering instruction.

On the other hand, the second selecting unit 45 selects the first temporary memory 26. The frame buffer rendering unit 22 performs blend processing between the first temporary memory 26 and the frame buffer 21 and writes a result of the blend processing in the frame buffer 21. The color code $C_{1F}$ represented by expression (8) is written in the frame buffer 21 anew.

When a figure drawn according to a rendering instruction deviates from the area B while the rendering processing is applied to the second temporary memory 27, the result of the blend processing performed between the first temporary memory 26 and the frame buffer 21 is written in the frame buffer 21. Then, the first selecting unit 44 allocates a new 64×64 pixel area (an area C) including the figure deviating from the area B to the first temporary memory 26. A color code and an alpha element recorded in the second temporary memory 27 at this point are $C_{2T}$ and $\alpha_{2T}$, respectively.

As long as a figure drawn according to a rendering instruction is within the area C, the first selecting unit 44 continues to select the first temporary memory 26. Consequently, the temporary memory rendering unit 43 applies rendering processing to the first temporary memory 26 according to the sent rendering instruction.

On the other hand, the second selecting unit 45 selects the second temporary memory 27. The frame buffer rendering unit 22 performs blend processing between the second temporary memory 27 and the frame buffer 21 and writes a result of the blend processing in the frame buffer 21. The color code $C_{2F}$ represented by expression (9) is written in the frame buffer 21 anew.

Thereafter, the rendering processing applied to the first temporary memory 26 and the rendering processing applied to the second temporary memory 27 is repeated alternately.

Note that it is also possible to use software to realize the operation of the rendering apparatus 40 in the second embodiment. In this case, a not-shown processing device executes a program of a flowchart shown in FIG. 6, whereby the functions of the frame buffer rendering unit 22, the temporary memory rendering unit 43, and the selecting units 44 and 45 are realized.

Figure 6:
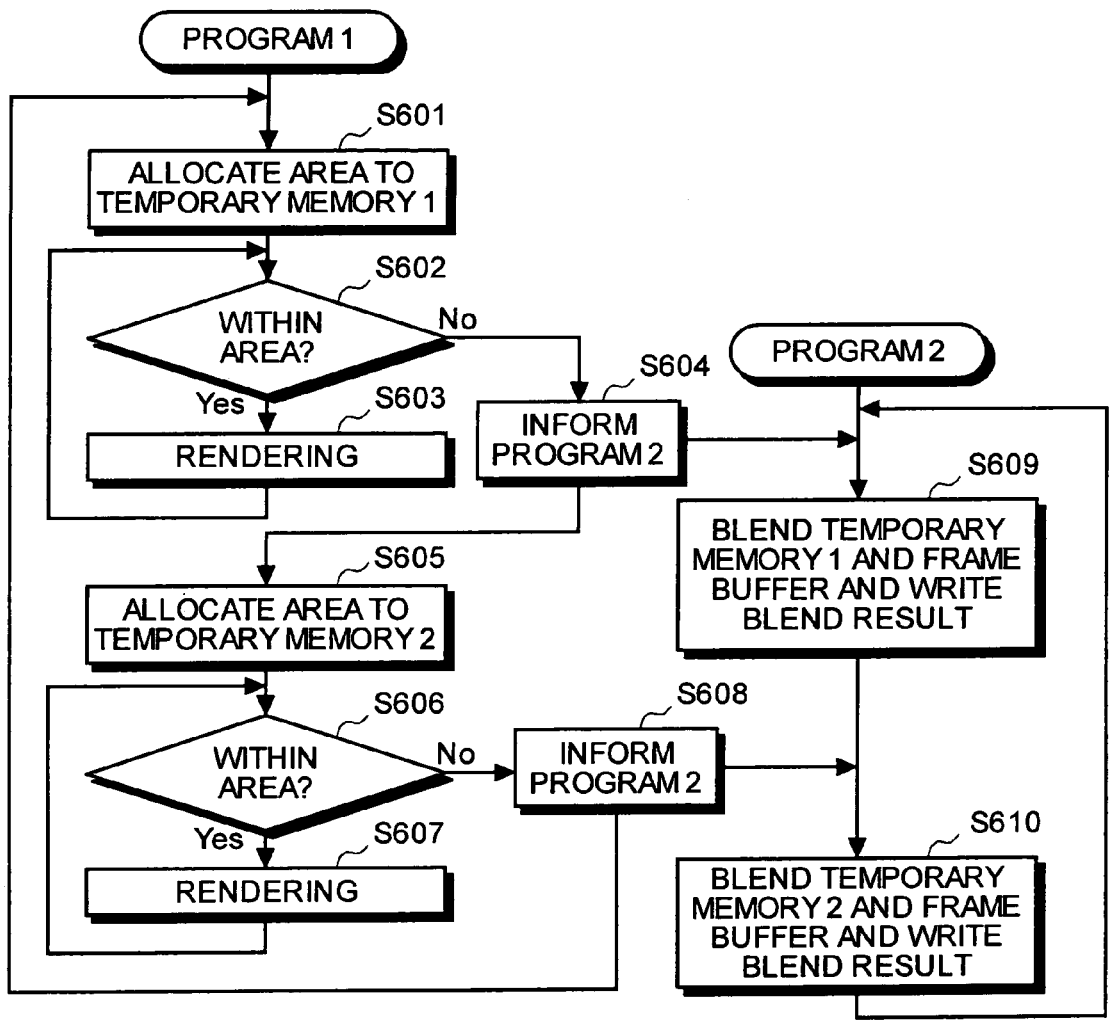
FIG. 6 is a flowchart of a program for realizing the rendering apparatus.

The flowchart shown in FIG. 6 will be explained. First, when a program 1 is executed, the processing device clears the first temporary memory 26 and the second temporary memory 27 and, then, allocates the area A to the first temporary memory 26 (step S601). As long as a figure drawn according to a rendering instruction is within the area A ("Yes" at step S602), the processing device applies rendering processing to the first temporary memory 26 (step S603).

When the figure drawn according to the rendering instruction deviates from the area A while the rendering processing is applied to the first temporary memory 26 ("No" at step S602), the processing device informs a program 2 of the deviation of the figure from the area A (step S604). In the program 2, the processing device performs blend processing between the first temporary memory 26 and the frame buffer 21 and writes a result of the blend processing in the frame buffer 21 (step S609).

On the other hand, in the program 1, the processing device allocates the area B to the second temporary memory 27 (step S605). As long as a figure drawn according to a rendering instruction is within the area B ("Yes" at step S606), the processing device applies rendering processing to the second temporary memory 27 (step S607).

When the figure drawn according to the rendering instruction deviates from the area B while the rendering processing is applied to the second temporary memory 27 ("No" at step S606), the processing device informs the program 2 of the deviation of the figure from the area B (step S608). In the program 2, the processing device performs blend processing between the second temporary memory 27 and the frame buffer 21 and writes a result of the blend processing in the frame buffer 21 (step S610). On the other hand, in the program 1, the processing device allocates the area C to the first temporary memory 26 (step S601). Thereafter, processing device executes steps S602 to S608.

According to the second embodiment, in the first and the second temporary memories 26 and 27, it is possible to perform blend processing for rendering results already stored in the temporary memories and rendering results to be rendered in the temporary memories. In addition, blend processing for a rendering result already stored in the frame buffer 21 and rendering results stored in the temporary memories 26 and 27 is performed according to the order of rendering instructions. Thus, high-speed rendering is possible and it is possible to perform alpha blend processing normally.

In a third embodiment of the invention, an calculation for a frame buffer and an calculation for display are performed separately. First, a method for the separation of the calculation will be explained.

A color code already rendered in the frame buffer is $C_F$ and a color code to be rendered first is $C_1$. A blend ratio (0.0 to 1.0) to be used first is $\alpha_1$. Then, a blend result $C_{1F}$ of the frame buffer color $C_F$ already rendered and the color $C_1$ to be rendered first is represented by the following expression (10).

$$C_{1F} = \alpha_1 C_1 + (1-\alpha_1) C_F \quad (10)$$

The color code already rendered in the frame buffer is set to $C_{1F}$ according to blend processing represented by expression (10). Next, a color code to be rendered second is $C_2$ and a blend ratio (0.0 to 1.0) to be used second is $\alpha_2$. In this case, a blend result $C_{21F}$ of the frame buffer color $C_{1F}$ already rendered and the color $C_2$ to be rendered second is represented by the following expression (11).

$$C_{21F} = \alpha_2 C_2 + (1-\alpha_2) C_{1F} \quad (11)$$

The color code already rendered in the frame buffer is set to $C_{21F}$ according to blend processing represented by expression (11). Therefore, when a color code to be rendered third is $C_3$ and a blend ratio (0.0 to 1.0) to be used third is $\alpha_3$, a blend result $C_{321F}$ of the frame buffer color $C_{21F}$ already rendered and the color $C_3$ to be rendered third is represented by the following expression (12).

$$C_{321F} = \alpha_3 C_3 + (1-\alpha_3) C_{21F} \quad (12)$$

Although not described here, blend results of color codes already rendered in the frame buffer and colors to be rendered fourth and subsequently are calculated in the same manner. The calculation in expressions (10) to (12) are modified as indicated by the following expressions (13) to (15), respectively. The modification of the calculation are the same for the blend results of color codes already rendered in the frame buffer and colors to be rendered fourth and subsequently.

$$C_{1F} = \alpha_1 C_1 + (1 - \alpha_1)C_F \quad (13)$$
$$= C'_1 + (1 - \alpha_1)C_F$$

$$C_{21F} = \alpha_2 C_2 + (1 - \alpha_2)C_{1F} \quad (14)$$
$$= \alpha_2 C_2 + (1 - \alpha_2)C'_1 + (1 - \alpha_2)(1 - \alpha_1)C_F$$
$$= C'_{21} + (1 - \alpha_2)(1 - \alpha_1)C_F$$

$$C_{321F} = \alpha_3 C_3 + (1 - \alpha_3)C_{21F} \quad (15)$$
$$= \alpha_3 C_3 + (1 - \alpha_3)C'_{21} + (1 - \alpha_3)(1 - \alpha_2)(1 - \alpha_1)C_F$$
$$= C'_{321} + (1 - \alpha_3)(1 - \alpha_2)(1 - \alpha_1)C_F$$

By modifying the calculation as described above, the calculation $C_1'$, $C_{21}'$, and $C_{321}'$ for the second and subsequent times for the frame buffer are separated from the calculation $(1-\alpha_1)C_F$, $(1-\alpha_2)(1-\alpha_1)C_F$, and $(1-\alpha_3)(1-\alpha_2)(1-\alpha_1)C_F$ for an initial value of the frame buffer. Therefore, it is possible to perform the calculation $C_1'$, $C_{21}'$, and $C_{321}'$ for the second and subsequent times for the frame buffer as usual rendering processing.

Color codes and alpha elements, which are recorded in the frame buffer in respective rendering stages, are $C_1'$ and $(1-\alpha_1)$ in rendering for the first time, $C_{21}'$ and $(1-\alpha_2)(1-\alpha_1)$ in rendering for the second time, and $C_{321}'$ and $(1-\alpha_3)(1-\alpha_2)(1-\alpha_1)$ in rendering for the third time. Thereafter, in the same manner, color codes and alpha elements to be recorded in the temporary memories are overwritten.

A color code and an alpha element, of a screen subjected to the rendering and blend processing in such a system are $C_s$ and $\alpha_s$, respectively, and the screen is a displaying blend screen. When a color code of a blend screen to be displayed is $C_D$, a calculation to be performed in display blend processing is represented by the following expression (16). In other words, the calculation for the color $C_F$ in the rendering for the first time is replaced with the calculation for the color $C_D$ of the blend screen to be displayed.

$$C_{SD} = C_S + \alpha_S C_S \quad (16)$$

Figure 7:
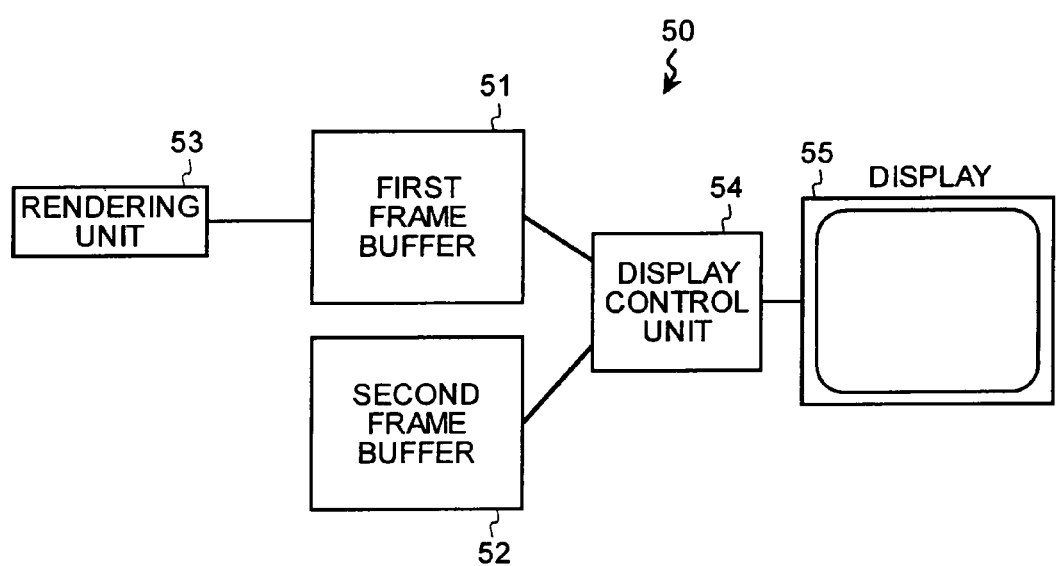
FIG. 7 is a block diagram of a schematic structure of a display control apparatus according to a third embodiment of the present invention.

Next, a specific constitution of the third embodiment will be explained. FIG. 7 is a block diagram of a schematic structure of a display control apparatus according to the third embodiment. As shown in FIG. 7, a display control apparatus 50 in the third embodiment includes a first frame buffer 51 that stores data of a transparent screen, a second frame buffer 52 that stores data of a background screen, a rendering unit 53 that applies rendering to the first frame buffer 51, and a display control unit 54 that subjects pixels of the first frame buffer 51 and pixels of the second frame buffer 52 to blend processing and displays a result of the blend processing on a display device 55 like a display.

Next, a structure of the rendering unit 53 will be explained. In this explanation, a color code and a blend ratio of images already rendered in the first frame buffer 51 are $C_t$ and $\alpha_t$, respectively. A color code and a blend ratio of images to be rendered in the first frame buffer are C and α, respectively.

Figure 8:
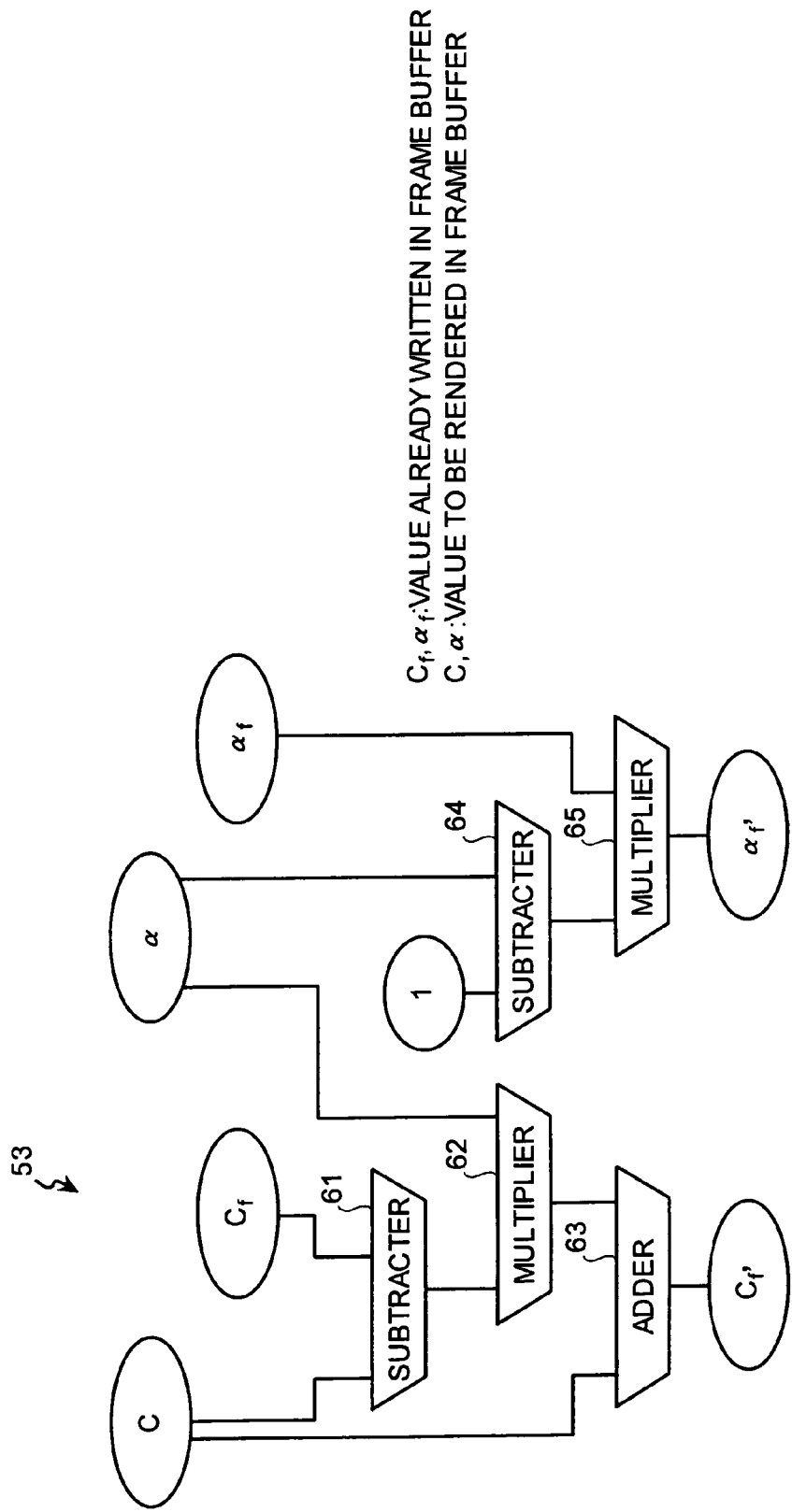
FIG. 8 is a block diagram of a structure of a rendering unit of the display control apparatus.

FIG. 8 is a block diagram of the structure of the rendering unit 53. The rendering unit 53 includes a first subtracter 61, a first multiplier 62, a first adder 63, a second subtracter 64, and a second multiplier 65. The color codes and the alpha elements in the respective rendering stages, that is, $C_1'$ and $(1-\alpha_1)$, $C_{21}'$ and $(1-\alpha_2)(1-\alpha_1)$, and $C_{321}'$ and $(1-\alpha_3)(1-\alpha_2)(1-+_1)$ are calculated according to calculation by the first subtracter 61, the first multiplier 62, the first adder 63, the second subtracter 64, and the second multiplier 65.

The first subtracter 61 subtracts the color code $C_t$ of the image already rendered in the first frame buffer 51 from the color code C of the image to be rendered in the first frame buffer 51. The first multiplier 62 multiplies a result of the calculation of the first subtracter 61 by the blend ratio α of the image to be rendered in the first frame buffer 51.

The first adder 63 adds the color code C of the image to be rendered in the first frame buffer 51 to a result of the calculation of the first multiplier 62. A result $C_t'$ of the calculation of the first adder 63 is stored in the first frame buffer 51 as a new color code of the image already rendered in the first frame buffer 51. In the next rendering applied to the first frame buffer 51, the result $C_t'$ is used as the color code $C_t$ of the image already rendered in the first frame buffer 51.

The second subtracter 64 subtracts the blend ratio α of the image to be rendered in the first frame buffer 51 from 1. The second multiplier 65 multiplies a result of the calculation of the second subtracter 64 by the blend ratio $\alpha_t$ of the image already rendered in the first frame buffer 51. A result $\alpha_t'$ of the second multiplier 65 is stored in the first frame buffer as a new blend ratio of the image already rendered in the first frame buffer 51. In the next rendering applied to the first frame buffer 51, the result $\alpha_t'$ is used as the blend ratio $\alpha_t$ of the image already rendered in the first frame buffer 51.

Next, a structure of the display control unit 54 will be explained. In this explanation, a color code and a blend ratio of a transparent screen rendered in the first frame buffer 51 are $C_s$ and $\alpha_s$, respectively, and a color code of a background screen rendered in the second frame buffer 52 is $C_d$.

Figure 9:
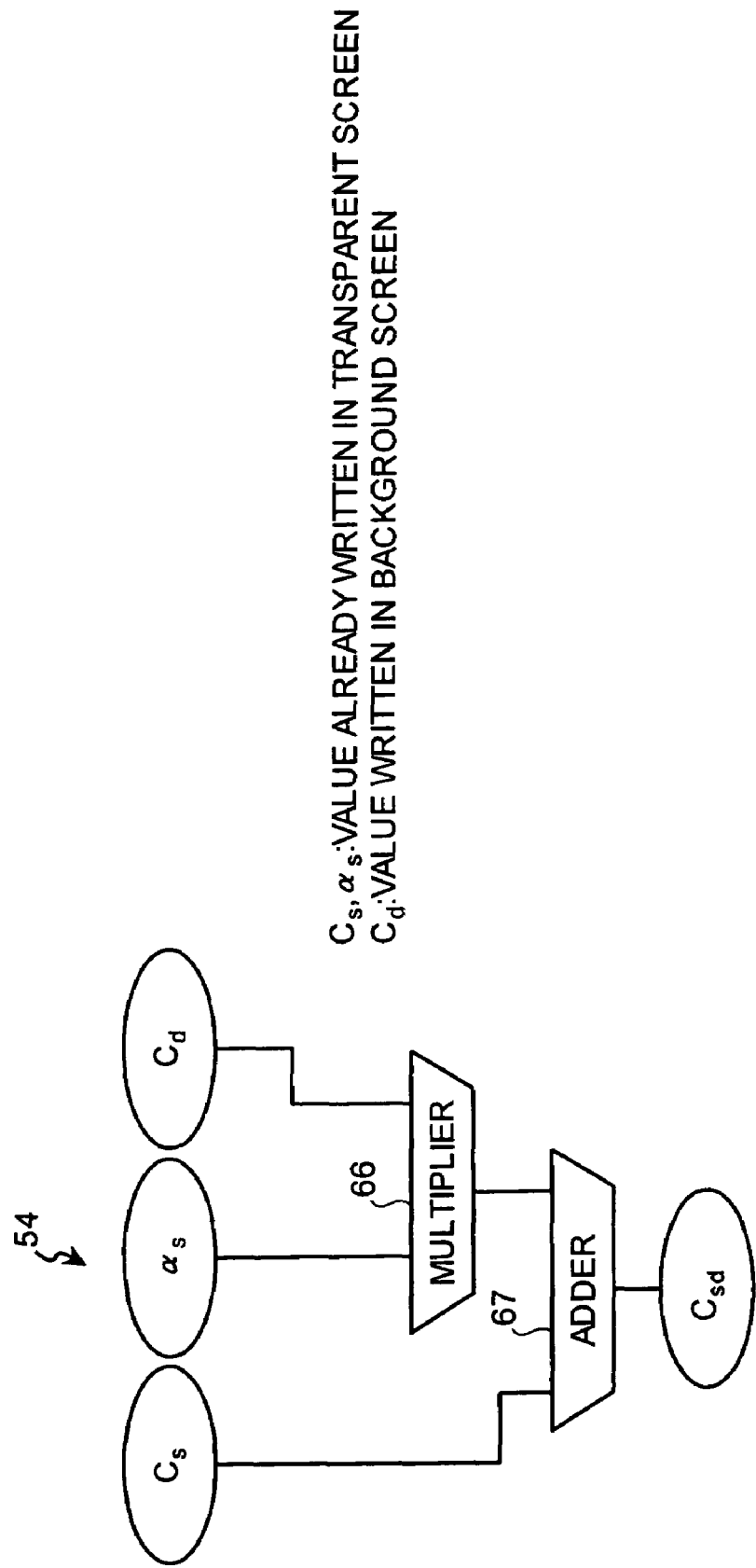
FIG. 9 is a block diagram of a structure of a display control unit of the display control apparatus.

FIG. 9 is a block diagram of the structure of the display control unit 54. The display control unit 54 includes a third multiplier 66 and a second adder 67. The calculation of expression (16) is performed according to calculation by the third multiplier 66 and the second adder 67. Note that $C_s$ equals $C_S$, $\alpha_s$ equals $\alpha_S$, and $C_d$ equals $C_D$.

The third multiplier 66 multiplies the color code $C_d$ of the image rendered in the second frame buffer 52 by the blend ratio $\alpha_s$ of the image rendered in the first frame buffer 51. The second adder 67 adds the color code $C_s$ of the image rendered in the first frame buffer 51 to a result of the calculation of the third multiplier 66. A result $C_{sd}$ of the calculation of the second adder 67 ($C_{SD}$ in expression (16)) is displayed on the display device 55.

Next, an operation of the display control apparatus 50 in the third embodiment will be explained. First, the first frame buffer 51 is cleared with C=0 and α=1.0 in advance. This clear processing is performed to set $C_f$ to αC and $\alpha_f$ to (1−α) at the time of a first operation in a blend processing operation in the rendering unit 53 shown in FIG. 8.

First, the rendering unit 53 applies rendering to the first frame buffer 51 (the transparent screen). The display control unit 54 reads out data stored in the first frame buffer 51 and the second frame buffer 52 (the background screen) and confirms a flag for controlling transmission and non-transmission provided for each pixel (hereinafter referred to as transmission/non-transmission control flag).

The display control unit 54 displays the data in the second frame buffer 52 for pixels with the transmission/non-transmission control flag set OFF. In addition, for pixels with the transmission/non-transmission control flag set ON, the display control unit 54 subjects pixel data in the first frame buffer 51 and pixel data in the second frame buffer 52 to blend processing and displays the pixel data.

Note that it is also possible to use software to realize a part of the operation of the display control apparatus 50 in the third embodiment. In this case, a not-shown processing device executes a program of a flowchart shown in FIG. 10, whereby the function of the rendering unit 53, that is, alpha blending in rendering processing is realized.

The flow chart shown in FIG. 10 will be explained. First, after clearing the first frame buffer 51, the processing device reads out a color code $C_f$ and a blend ratio $\alpha_f$ from the first frame buffer 51 (step S1001). The processing device calculates $C_f'$ represented by the next expression (17) (step S1002). In addition, the processing device calculates $\alpha_f'$ represented by the following expression (18) (step S1003).

$$C_f' = \alpha C + (1-\alpha)C_f \quad (17)$$

$$\alpha_f' = \alpha_f(1-\alpha) \quad (18)$$

Subsequently, the processing device writes $C_f'$ and $\alpha_f'$ obtained from expressions (17) and (18) in the first frame buffer 51 (step S1004). The processing device repeats the processing until the processing is finished for all the pixels (step S1005). In the processing, $C_f'$ and $\alpha_f'$ written in the first frame buffer 51 anew are read out as the color code $C_f$ and the blend ratio $\alpha_f$ of the first frame buffer 51.

In the third embodiment, the rendering unit 53 subjects a rendering result already stored in the first frame buffer 51 and a rendering result of rendering to be applied to the first frame buffer 51 to blend processing. The display control unit 54 subjects the rendering result stored in the first frame buffer 51 and a rendering result stored in the second frame buffer 52 to transmission or non-transmission processing by a unit of pixel and synthesizes the rendering results. Thus, according to the third embodiment, even when display transmission/non-transmission processing is performed together with alpha blending in rendering processing, it is possible to obtain a display result, in which the respective processing are synthesized, correctly.

In the third embodiment, the display control unit 54 subjects the rendering result stored in the first frame buffer 51 and the rendering result stored in the second frame buffer 52 to transmission or non-transmission processing by a unit of pixel and synthesizes the rendering results. On the other hand, in the fourth embodiment, the display control unit 54 subjects the rendering result stored in the first frame buffer 51 and the rendering result stored in the second frame buffer 52 to blend processing and synchronizes the rendering results. Since the display control unit 54 in the fourth embodiment is the same as that in the third embodiment except the above points, redundant explanations are omitted.

A structure of the display control unit 54 will be explained. In this explanation, a color code and a blend ratio of a transparent screen rendered in the first frame buffer 51 are $C_s$ and $\alpha_s$, respectively, and a color code of a background screen rendered in the second frame buffer 52 is $C_d$. In addition, a display transmittance of the transparent screen and the background screen, that is, a display blend ratio is $\alpha_x$.

Figure 11:
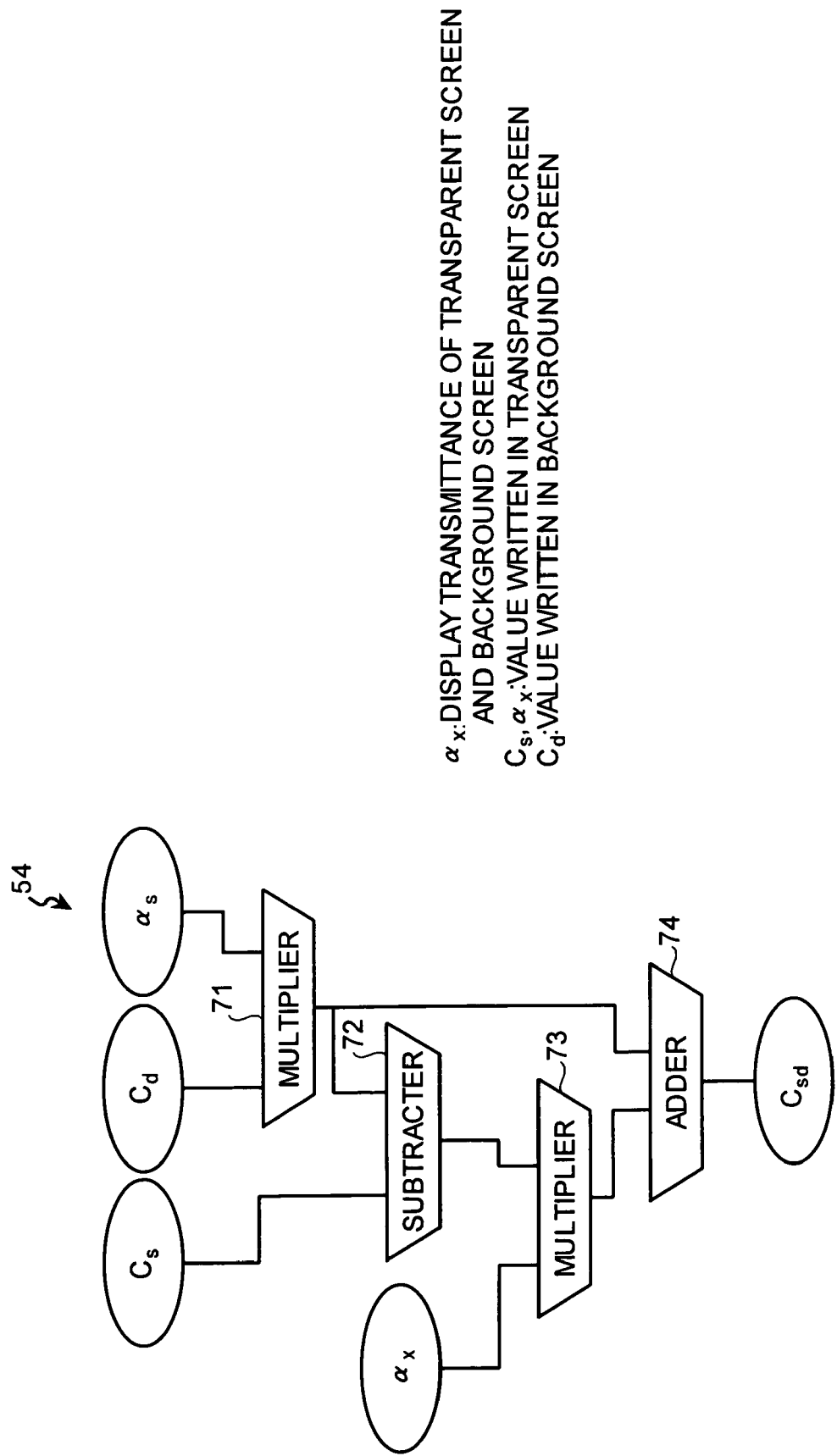
FIG. 11 is a block diagram of a structure of a display control unit of a display control apparatus according to a fourth embodiment of the present invention.

FIG. 11 is a block diagram of the structure of the display control unit 54. The display control unit 54 includes a third multiplier 71, a third subtracter 72, a fourth multiplier 73, and a second adder 74. The calculation of expression (16) is performed according to calculation by the third multiplier 71 and the second adder 74. Note that $C_s$ equals $C_S$, $\alpha_s$ equals $\alpha_S$, and $C_d$ equals $C_D$.

The third multiplier 71 multiplies the color code $C_d$ of the image rendered in the second frame buffer 52 by the blend ratio $\alpha_s$ of the image rendered in the first frame buffer 51. The third subtracter 72 subtracts a result of the calculation of the third multiplier 71 from the color code $C_s$ of the image rendered in the first frame buffer 51.

The fourth multiplier 73 multiplies a result of the calculation of the third subtracter 72 by the blend ratio $\alpha_s$ of the image rendered in the first frame buffer 51. The second adder 74 adds the result of the calculation of the third multiplier 71 to a result of the calculation of the fourth multiplier 73. An output $C_{sd}$ of the second adder 74 is displayed on the display device 55. The result $C_{sd}$ of the calculation of the second adder 74 is represented by the following expression (19).

$$\begin{aligned}C_{sd} &= \alpha_x C_s + (1-\alpha_x)\alpha_s C_d \\ &= \alpha_x(C_s - \alpha_s C_d) + \alpha_s C_d\end{aligned} \quad (19)$$

Next, an operation of the display control apparatus 50 in the fourth embodiment will be explained. First, the first frame buffer 51 is cleared with C=0 and $\alpha$=1.0 in advance. The rendering unit 53 applies rendering to the first frame buffer 51 (the transparent screen). The display control unit 54 reads out data stored in the first frame buffer 51 and data stored the second frame buffer 52 (the background screen) and subjects the data to blend processing at the display transmittance $\alpha_x$. Then, the display control unit 54 displays a result obtained by subjecting pixel data in the first frame buffer 51 and pixel data in the second frame buffer 52 to the bland processing at the transmittance $\alpha_x$.

Figure 10:
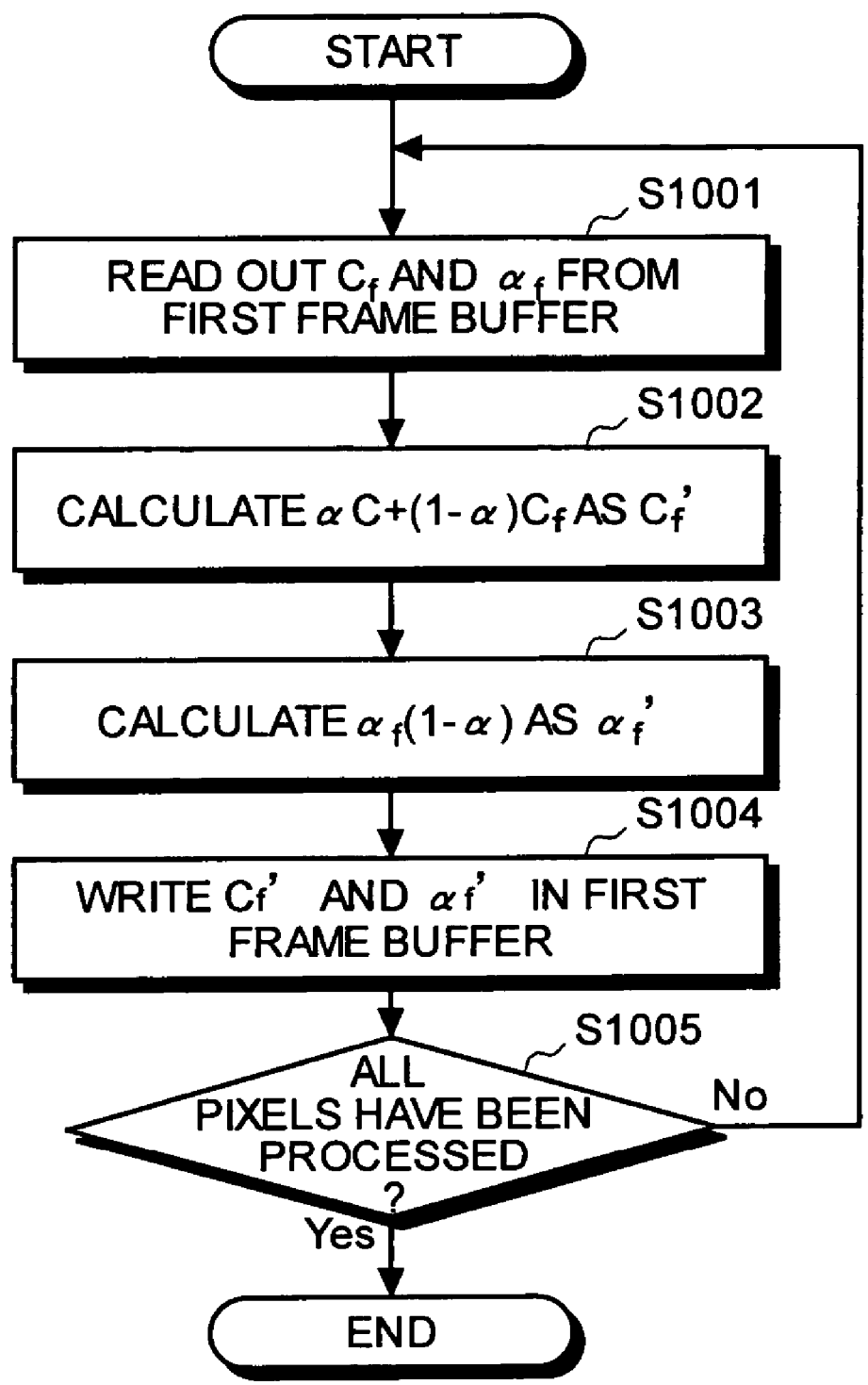
FIG. 10 is a flowchart of a program for realizing a part of the display control apparatus according to the third embodiment.

Note that, in the fourth embodiment, as in the third embodiment, a not-shown processing device executes the program of the flowchart shown in FIG. 10, whereby it is possible to realize the function of the rendering unit 53. An explanation of the flowchart shown in FIG. 10 is omitted because the explanation is redundant.

In the fourth embodiment, the rendering unit 53 subjects a rendering result already stored in the first frame buffer 51 and a rendering result of rendering to be applied to the first frame buffer 51 to blend processing. The display control unit 54 subjects the rendering result stored in the first frame buffer 51 and a rendering result stored in the second frame buffer 52 to the blend processing and synthesizes the rendering results. Thus, according to the fourth embodiment, even when alpha blending in display processing is performed together with alpha blending in rendering processing, it is possible to obtain a display result, in which the respective processing are synthesized, correctly.

Figure 12:
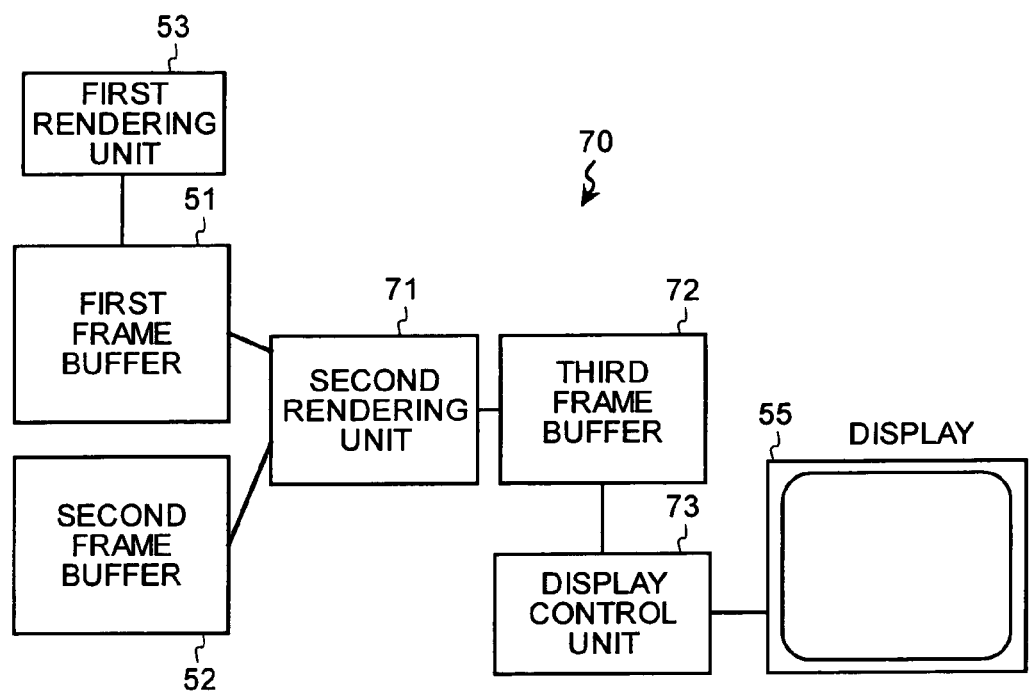
FIG. 12 is a block diagram of a schematic structure of a display control apparatus according to a fifth embodiment of the present invention.

FIG. 12 is a block diagram of a schematic structure of a display control apparatus according to a fifth embodiment. As shown in FIG. 12, a display control apparatus 70 in the fifth embodiment includes a first frame buffer 51 that stores data of a transparent screen, a second frame buffer 52 that stores data of a background screen, a rendering unit (a first rendering unit) 53 that applies rendering to the first frame buffer 51, a second rendering unit 71 that subjects pixels of the first frame buffer 51 and pixels of the second frame buffer 52 to blend processing, a third frame buffer 72 that stores a result of the blend processing of the second rendering unit 71, and a display control unit 73 that displays data stored in the third frame buffer 72 on a display device 55 like a display.

In the following description, only components of the display control apparatus 70 in the fifth embodiment different from those of the display control apparatus 50 in the third embodiment will be explained. Components same as those in the third embodiment are denoted by the identical reference numerals and signs and explanations of the components are omitted. The second rendering unit 71 has the same blending function as the display control unit 54 in the third embodiment. In other words, the second rendering unit 71 has the structure shown in FIG. 9. In the fifth embodiment, the display control unit 73 does not have the blending function.

Next, an operation of the display control apparatus 70 in the fifth embodiment will be explained. First, the first frame buffer 51 is cleared with C=0 and α=1.0 in advance. The rendering unit 53 applies rendering to the first frame buffer 51 (the transparent screen). The second rendering unit 71 reads out data stored in the first frame buffer 51 and data stored in the second frame buffer 52 (the background screen) and confirms a transmission/non-transmission control flag provided for each pixel.

The second rendering unit 71 stores the data, which is stored in the second frame buffer 52, in the third frame buffer 72 for pixels with the transmission/non-transmission control flag set OFF. In addition, for pixels with the transmission/non-transmission control flag set ON, the second rendering unit 71 stores a result, which is obtained by subjecting pixel data in the first frame buffer 51 and pixel data in the second frame buffer 52 to blend processing, in the third frame buffer 72. The display control unit 73 reads out the data in the third frame buffer 72 and displays contents of the data on the display device 55 such as a display.

Note that it is also possible to use software to realize the operation of the display control apparatus 70 in the fifth embodiment. In this case, a not-shown processing device executes a program of a flowchart shown in FIG. 13, whereby the functions of the first rendering unit 53 and the second rendering unit 71 are realized.

Figure 13:
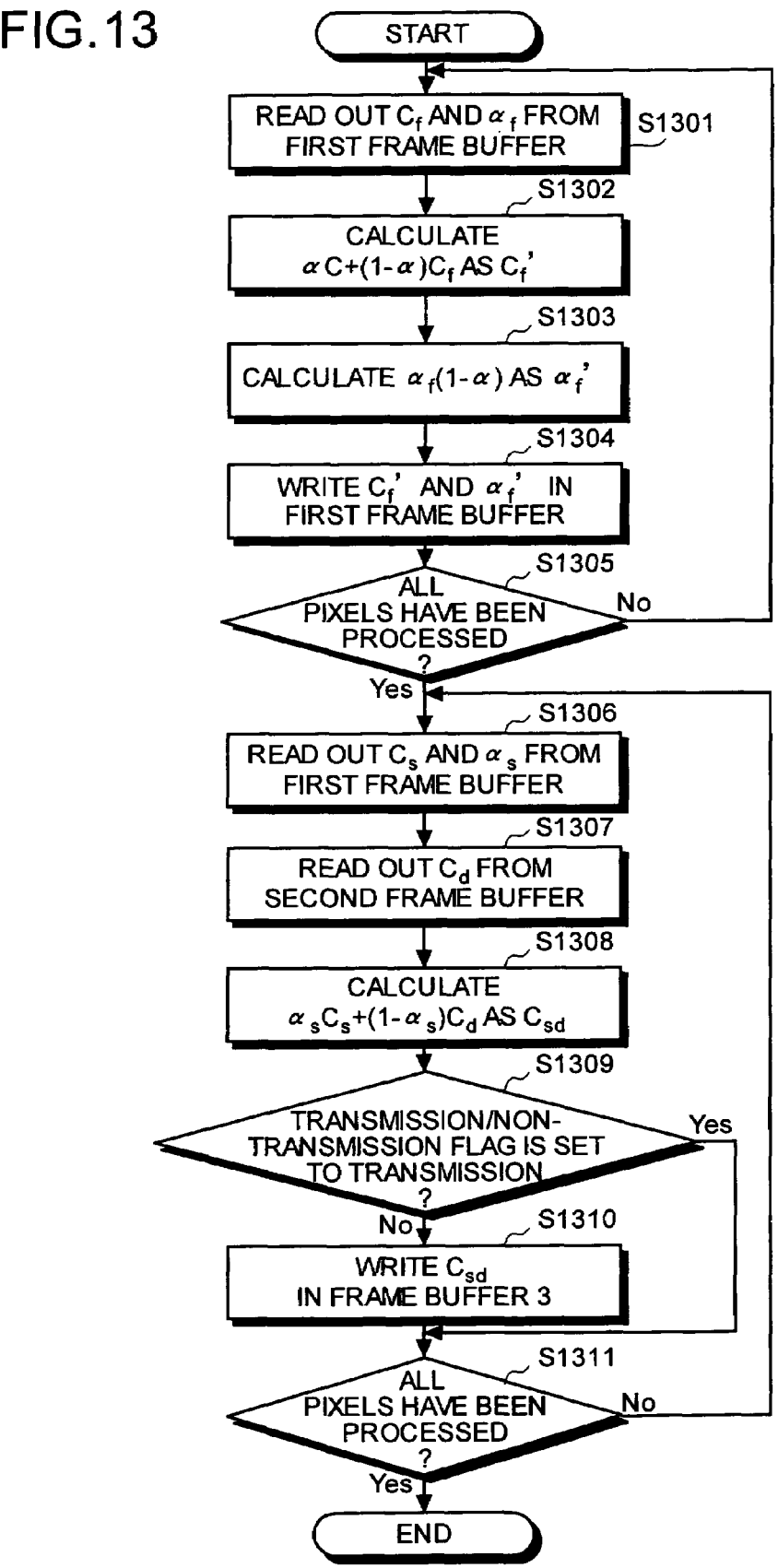
FIG. 13 is a flowchart of a program for realizing the display control apparatus.

The flow chart shown in FIG. 13 will be explained. First, after clearing the first frame buffer 51, the processing device reads out a color code $C_f$ and a blend ratio $\alpha_f$ from the first frame buffer 51 (step S1301). The processing device calculates $C_f'$ represented by expression (17) (step S1302). In addition, the processing device calculates $\alpha_f'$ represented by expression (18) (step S1303).

Subsequently, the processing device writes $C_f'$ and $\alpha_f'$ obtained from expressions (17) and (18) in the first frame buffer 51 (step S1304). The processing device repeats the processing until the processing is finished for all the pixels (step S1305). In the processing, $C_f'$ and $\alpha_f'$ written in the first frame buffer 51 anew are read out as the color code $C_f$ and the blend ratio $\alpha_f$ of the first frame buffer 51.

When the processing for writing $C_f'$ and $\alpha_f'$ in the first frame buffer 51 is finished ("Yes" at step S1305), the processing device reads out a color code $C_s$ and a blend ratio $\alpha_s$ of a transparent screen from the first frame buffer 51 (step S1306). In addition, the processing device reads out a color code $C_d$ of a background screen from the second frame buffer 52 (step S1307). Subsequently, the processing device performs an calculation of the next expression (20) to calculate $C_{sd}$ (step S1308).

$$C_{sd} = \alpha_s C_s + (1-\alpha_s)C_d \qquad (20)$$

If the transmission/non-transmission control flag is set to non-transmission ("No" at step S1309), the processing device writes $C_{sd}$ in the third frame buffer 72 (step S1310). On the other hand, if the transmission/non-transmission control flag is set to transmission ("Yes" at step S1309), the processing device does not write $C_{sd}$ in the third frame buffer 72. The processing device repeats steps S1306 to S1311 until the processing is finished for all the pixels (step S1311).

In the fifth embodiment, the first rendering unit 53 subjects a rendering result already stored in the first frame buffer 51 and a rendering result of rendering to be applied to the first frame buffer 51 to blend processing. The second rendering unit 71 subjects the rendering result stored in the first frame buffer 51 and a rendering result stored in the second frame buffer 52 to transmission or non-transmission processing by a unit of pixel and synthesizes the rendering results. Thus, according to the fifth embodiment, even when display transmission/non-transmission processing is performed together with alpha blending in rendering processing, it is possible to obtain a display result, in which the respective processing are synthesized, correctly.

In a sixth embodiment, the alpha blending in rendering processing and the alpha blending in display processing same as those in the fourth embodiment are performed by the same structure as the display control apparatus 70 in the fifth embodiment shown in FIG. 12. Since the overall structure is as shown in FIG. 12, redundant explanations are omitted. In the sixth embodiment, the second rendering unit 71 has the same blending function as the display control unit 54 in the third embodiment. In other words, the second rendering unit 71 has the structure shown in FIG. 11. In addition, the display control unit 73 does not have the blending function.

Next, an operation of the display control apparatus 70 in the sixth embodiment will be explained. First, the first frame buffer 51 is cleared with C=0 and α=1.0 in advance. The first rendering unit 53 applies rendering to the first frame buffer 51 (the transparent screen). The second rendering unit 71 reads out data stored in the first frame buffer 51 and the second frame buffer 52 (the background screen) and applies blend processing to the data at a display transmittance $\alpha_x$.

The second rendering unit 71 stores a result, which is obtained by subjecting pixel data in the first frame buffer 51 and pixel data in the second frame buffer 52 to the blend processing at the display transmittance $\alpha_x$, in the third frame buffer 72. The display control unit 73 reads out data in the third frame buffer 72 and displays contents of the data on the display device 55 such as a display.

Note that it is also possible to use software to realize the operation of the display control apparatus 70 in the sixth embodiment. In this case, a not-shown processing device executes a program of a flowchart shown in FIG. 14, whereby the functions of the first rendering unit 53 and the second rendering unit 71 are realized.

Figure 14:
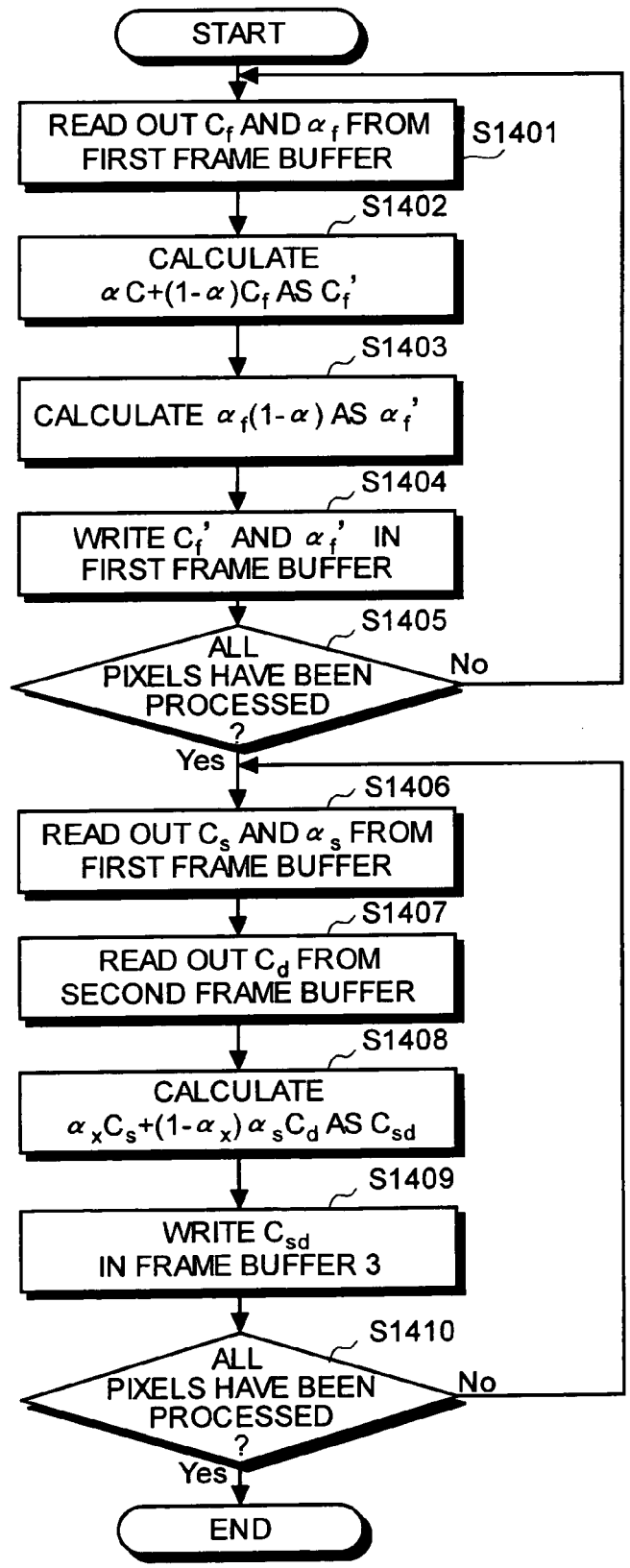
FIG. 14 is a flowchart of a program for realizing a display control apparatus according to a sixth embodiment of the present invention.
Figure 15:
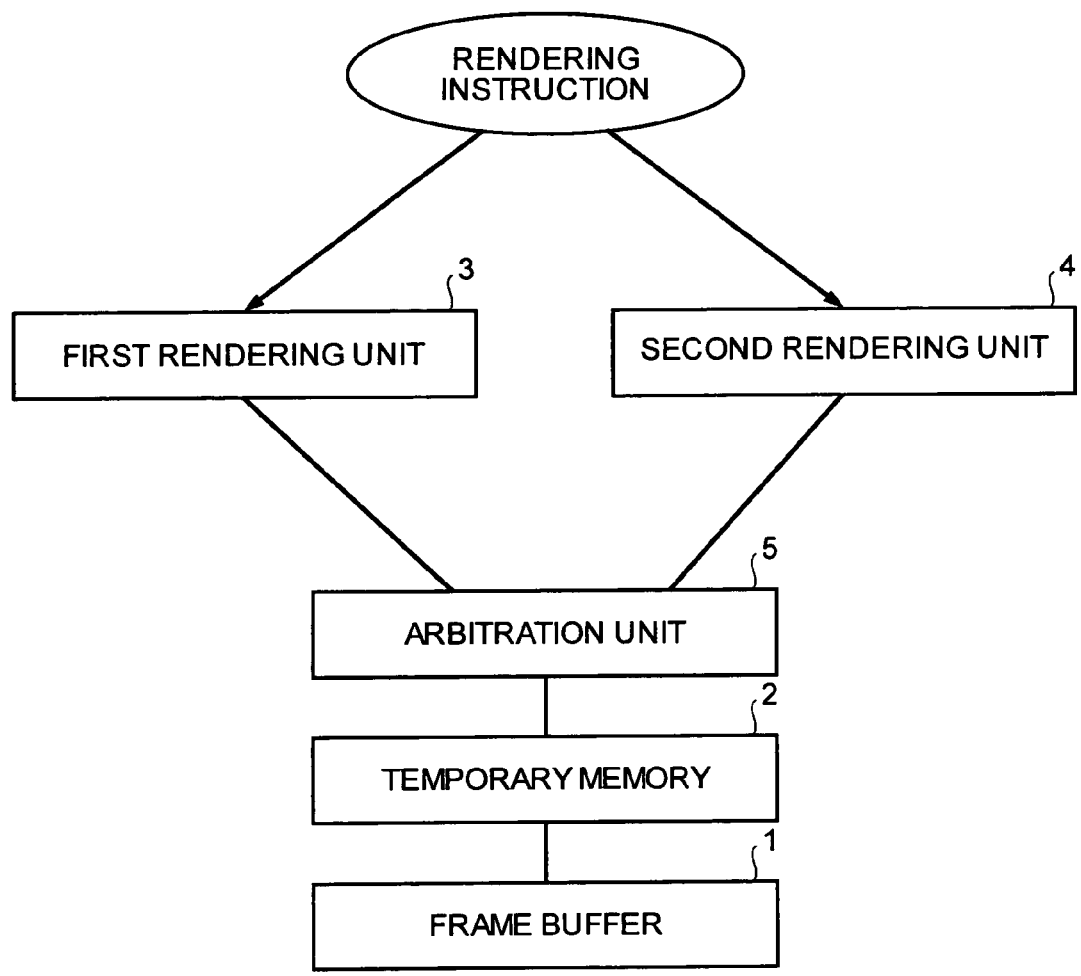
FIG. 15 is a block diagram of a schematic structure of a conventional rendering apparatus.
Figure 16:
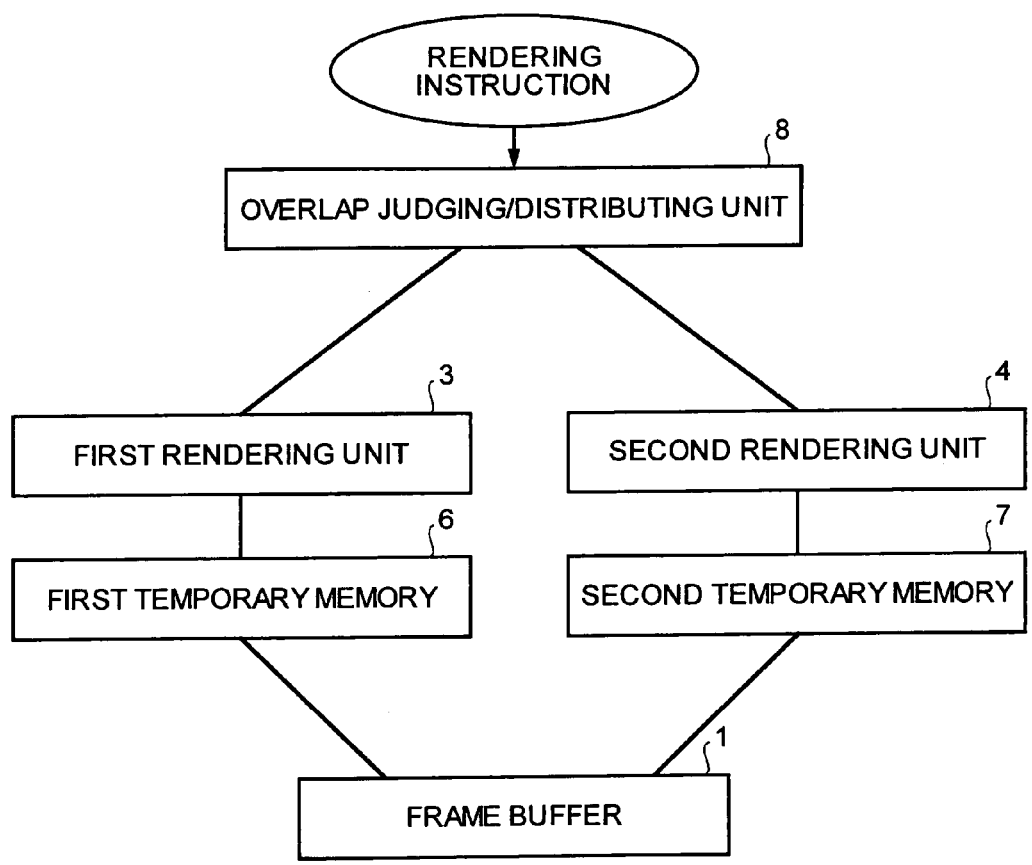
FIG. 16 is a block diagram of a schematic structure of a conventional rendering apparatus.
Figure 17A:
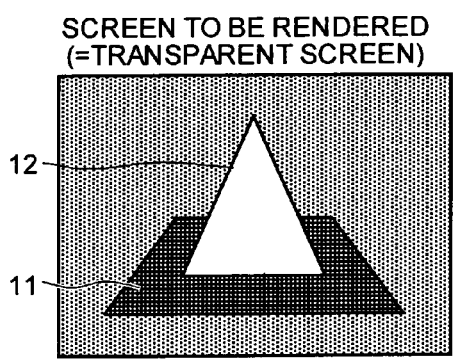
FIGS. 17A to C are schematic diagrams for explaining a result of transmission/non-transmission processing without alpha blending in rendering processing.
Figure 17B:
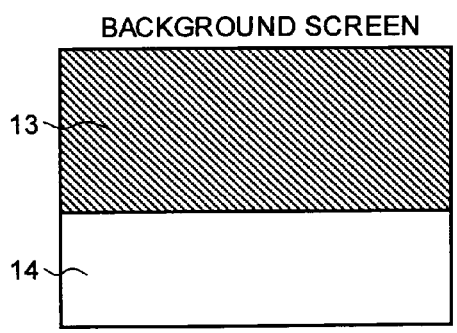
Figure 17C:
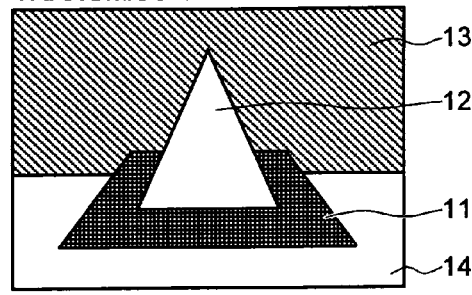
Figure 18A:
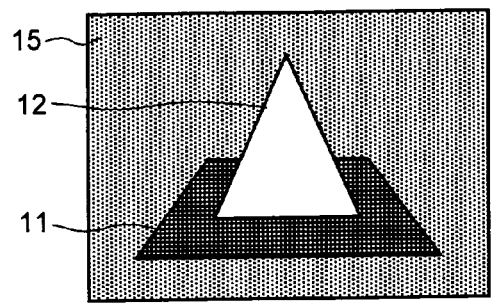
FIGS. 18A and B are schematic diagrams for explaining a result of alpha blending in rendering processing.
Figure 18B:
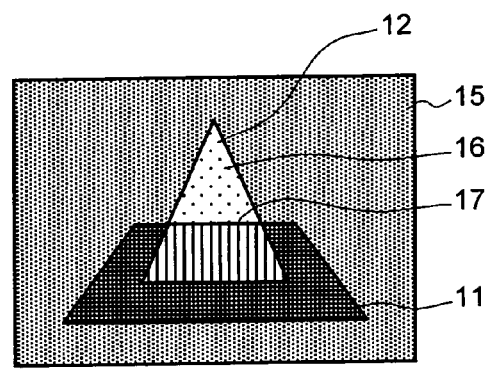
Figure 19A:
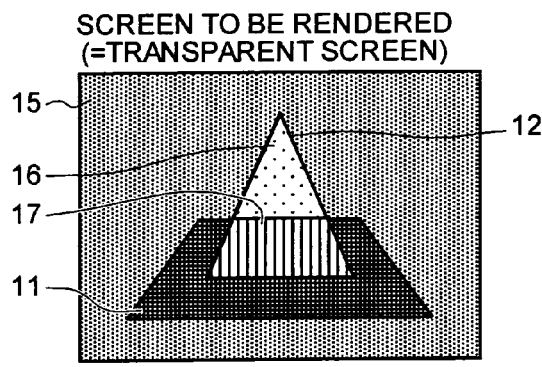
FIGS. 19A to D are schematic diagrams for explaining a result of transmission/non-transmission processing with alpha blending in rendering processing.
Figure 19B:
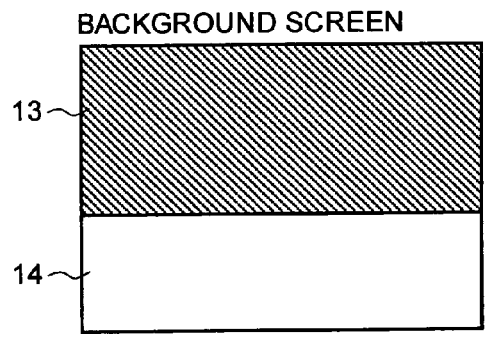
Figure 19C:
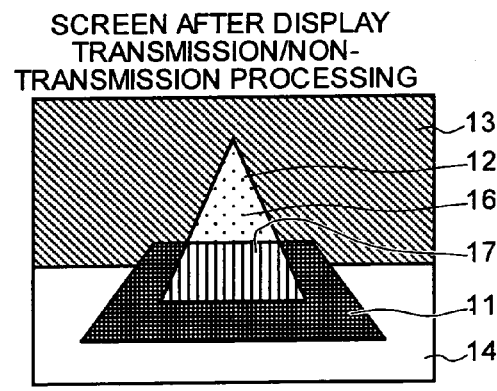
Figure 19D:
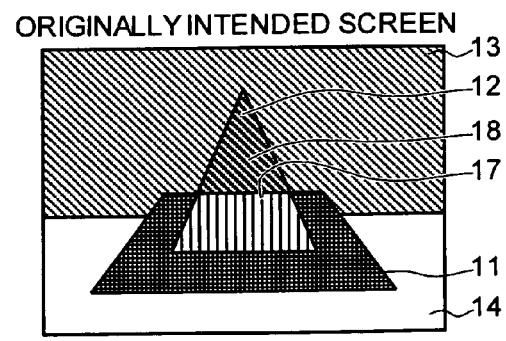

The flowchart shown in FIG. 14 will be explained. First, after clearing the first frame buffer 51, the processing device reads out a color code $C_f$ and a blend ratio $\alpha_f$ from the first frame buffer 51 (step S1401). The processing device calculates $C_f'$ represented by expression (17) (step S1402). In addition, the processing device calculates $\alpha_f'$ represented by expression (18) (step S1403).

Subsequently, the processing device writes $C_f'$ and $\alpha_f'$ obtained from expressions (17) and (18) in the first frame buffer 51 (step S1404). The processing device repeats the processing until the processing is finished for all the pixels (step S1405). In the processing, $C_f'$ and $\alpha_f'$ written in the first frame buffer 51 anew are read out as the color code $C_f$ and the blend ratio $\alpha_f$ of the first frame buffer 51.

When the processing for writing $C_f'$ and $\alpha_f'$ in the first frame buffer 51 is finished ("Yes" at step S1405), the processing device reads out a color code $C_s$ and a blend ratio $\alpha_s$ of a transparent screen from the first frame buffer 51 (step S1406). In addition, the processing device reads out a color code $C_d$ of a background screen from the second frame buffer 52 (step S1407). Subsequently, the processing device performs an calculation of expression (19) to calculate $C_{sd}$ (step S1408).

Then, the processing device writes $C_{sd}$ in the third frame buffer 72 (step S1409). The processing device repeats steps S1406 to S1410 until the processing is finished for all the pixels (step S1410).

In the sixth embodiment, the first rendering unit 53 subjects a rendering result already stored in the first frame buffer 51 and a rendering result of rendering to be applied to the first frame buffer 51 to blend processing. The second rendering unit 71 subjects the rendering result stored in the first frame buffer 51 and a rendering result stored in the second frame buffer 52 to the blend processing and synthesizes the rendering results. Thus, according to the sixth embodiment, even when alpha blending in display processing is performed together with alpha blending in rendering processing, it is possible to obtain a display result, in which the respective processing are synthesized, correctly.

In the above description, the invention is not limited to the embodiments but can be changed in various ways.

According to the invention, it is possible to obtain a rendering apparatus that is capable of performing high-speed rendering and performing alpha blend processing normally. It is also possible to obtain a display control apparatus that is, even when display transmission/non-transmission processing or alpha blending in display processing is performed together with alpha blending in rendering processing, capable of obtaining a display result, in which the respective processing are synthesized, correctly.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A rendering apparatus that blends a plurality of source images into a destination image stored in a frame buffer and renders a blended image of the source images and the destination image on a display, comprising:
   a temporary memory of higher speed and smaller capacity than the frame buffer;
   a calculating unit that calculates a first data and a second data without using the destination image and stores the first data and the second data in the temporary memory; and
   a blending unit that blends the source images into the destination image using the first data and the second data stored in the temporary memory to obtain the blended image, and stores the blended image in the frame buffer, wherein
   the calculating unit includes
      a first subtracter that subtracts a color code $C_t$, which is the first data previously calculated and stored in the temporary memory, from a color code C of one of the source images;
      a first multiplier that multiplies an output of the first subtracter by a blend ratio α of the source image;
      an adder that adds the color code C to an output of the first multiplier;
      a second subtracter that subtracts the blend ratio α from 1; and
      a second multiplier that multiplies an output of the second subtracter by a blend ratio $α_t$, which is the second data previously calculated and stored in the temporary memory, and
   the calculating unit overwrites the color code $C_t$ by an output of the adder and overwrites the blend ratio $α_t$ by an output of the second multiplier.

2. The rendering apparatus according to claim 1, wherein the rendering apparatus includes a plurality of sets of the temporary memory and the calculating unit, and
   the blending unit blends the source images into the destination image using a plurality of sets of the first data and the second data, each of which is calculated independently of each other and stored in one of the temporary memories to obtain the blended image.

3. The rendering apparatus according to claim 1, wherein the rendering apparatus includes a plurality of temporary memories, and
   the rendering apparatus further includes a selecting unit that selects one of the temporary memories, and
   the blending unit blends the source images into the destination image using the first data and the second data stored in the temporary memory selected.

4. The rendering apparatus according to claim 1, wherein the blending unit includes
   a multiplier that multiplies a color code $C_f$ of the destination image stored in the frame buffer by the blend ratio $α_t$ stored in the temporary memory; and
   an adder that adds the color code $C_t$ stored in the temporary memory to an output of the multiplier, wherein
   the blending unit overwrites the color code $C_f$ by an output of the adder.

5. The rendering apparatus according to claim 1, further comprising a display control unit that displays the blended image on the display in such a way that a pixel in the blended image is transparent and another pixel in the blended image is not transparent.

6. The rendering apparatus according to claim 5, wherein the display control unit includes
   a multiplier that multiplies a color code $C_d$ of a background image by the blend ratio $α_t$ stored in the temporary memory; and
   an adder that adds the color code $C_t$ stored in the temporary memory to an output of the multiplier.

7. The rendering apparatus according to claim 1, further comprising a display control unit that displays a blended image of a background image and the blended image stored in the frame buffer.

8. The rendering apparatus according to claim 7, wherein the display control unit includes
   a first multiplier that multiplies a color code $C_d$ of the background image by a blend ratio $α_s$ of the blended image stored in the frame buffer;
   a subtracter that subtracts an output of the first multiplier from a color code $C_t$ of the blended image stored in the frame buffer;
   a second multiplier that multiplies an output of the subtracter by a display transmittance $α_x$ of the blended image stored in the frame buffer and the background image; and
   an adder that adds an output of the second multiplier to an output of the first multiplier.

9. A rendering apparatus that blends a plurality of source images into a destination image stored in a frame buffer and renders a blended image of the source images and the destination image on a display, comprising:
   a temporary memory of higher speed and smaller capacity than the frame buffer; and
   a processor that executes a computer program, wherein the computer program causes the processor to execute calculating a first data and a second data without using the destination image;
   storing the first data and the second data in the temporary memory;

blending the source images into the destination image using the first data and the second data stored in the temporary memory to obtain the blended image; and storing the blended image in the frame buffer, wherein calculating the first data and the second data includes first-subtracting a color code $C_t$, which is the first data previously calculated and stored in the temporary memory, from a color code C of one of the source images;

first-multiplying a result of the first-subtracting by a blend ratio α of the source image ; first-multiplying a result of the first-subtracting by a blend ratio α of the source image;

adding the color code C to a result of the first multiplying;

second-subtracting the blend ratio α from 1; and second-multiplying a result of the second-subtracting by a blend ratio $α_t$, which is the second data previously calculated and stored in the temporary memory.

10. The rendering apparatus according to claim 9, wherein the rendering apparatus includes a plurality of sets of the temporary memory and the processor, and the computer program causes each of the processor to execute calculating, independently of each other, the first data and the second data for a specific area of the source images without using the destination image;

storing the first data and the second data in a corresponding temporary memory;

blending the source images into the destination image using a plurality of sets of the first data and the second data stored in the temporary memories to obtain the blended image; and storing the blended image in the frame buffer.

11. The rendering apparatus according to claim 9, wherein the rendering apparatus includes the temporary memory in plural, and the computer program causes the processor to execute calculating the first data and the second data for a specific area of the source images without using the destination image;

storing the first data and the second data in one of the temporary memories;

blending the source images into the destination image using a plurality of sets of the first data and the second data stored in the temporary memories to obtain the blended image; and storing the blended image in the frame buffer.

12. The rendering apparatus according to claim 9, further comprising a display control unit that displays the blended image on the display in such a way that a pixel in the blended image is transparent and another pixel in the blended image is not transparent.

13. The rendering apparatus according to claim 9, further comprising a display control unit that displays a blended image of a background image and the blended image stored in the frame buffer.

14. The rendering apparatus according to claim 9, wherein calculating the first data and the second data further includes:

overwriting the color code $C_t$ by a result of the adding and overwriting the blend ratio $α_t$ by a result of the second-multiplying.

\* \* \* \* \*